United States Patent
O'Neil

(10) Patent No.: US 7,664,094 B1
(45) Date of Patent: *Feb. 16, 2010

(54) SYSTEM FOR UTILIZING GENETIC ALGORITHM TO PROVIDE CONSTRAINT-BASED ROUTING OF PACKETS IN A COMMUNICATION NETWORK

(75) Inventor: Joseph Thomas O'Neil, Staten Island, NY (US)

(73) Assignee: AT&T Corp., New York, NY (US)

(*) Notice: Subject to any disclaimer, the term of this patent is extended or adjusted under 35 U.S.C. 154(b) by 50 days.

This patent is subject to a terminal disclaimer.

(21) Appl. No.: 11/504,209

(22) Filed: Aug. 14, 2006

Related U.S. Application Data

(63) Continuation of application No. 10/012,976, filed on Dec. 10, 2001, now Pat. No. 7,092,378.

(51) Int. Cl.
*H04L 12/28* (2006.01)
(52) U.S. Cl. .................. 370/351; 370/428; 370/466
(58) Field of Classification Search ............... 370/351, 370/242, 244, 254–255, 230, 428, 466
See application file for complete search history.

(56) References Cited

U.S. PATENT DOCUMENTS

| | | | |
|---|---|---|---|
| 5,715,432 A * | 2/1998 | Xu et al. ................. 715/764 |
| 5,778,317 A | 7/1998 | Kaminsky | |
| 5,787,271 A * | 7/1998 | Box et al. ..................... 714/4 |
| 5,809,489 A | 9/1998 | Davidor | |
| 5,917,898 A * | 6/1999 | Bassa et al. ................. 379/133 |
| 5,963,727 A | 10/1999 | Shih et al. | |
| 5,970,064 A * | 10/1999 | Clark et al. ................. 370/351 |
| 5,974,127 A * | 10/1999 | Wernli et al. ........... 379/201.01 |
| 6,088,690 A | 7/2000 | Gounares et al. | |
| 6,310,883 B1 * | 10/2001 | Mann et al. ................. 370/408 |
| 6,314,093 B1 * | 11/2001 | Mann et al. ................. 370/351 |
| 6,349,090 B1 * | 2/2002 | Lewis et al. ................. 370/238 |
| 6,377,543 B1 * | 4/2002 | Grover et al. ............... 370/227 |
| 6,421,349 B1 * | 7/2002 | Grover ........................ 370/408 |
| 6,442,615 B1 * | 8/2002 | Nordenstam et al. ........ 709/241 |
| 6,490,566 B1 * | 12/2002 | Schmidt ........................ 705/8 |
| 6,542,468 B1 * | 4/2003 | Hatakeyama ............... 370/238 |
| 6,771,673 B1 * | 8/2004 | Baum et al. ................. 370/535 |
| 6,771,873 B2 * | 8/2004 | Premaratne et al. ......... 385/147 |
| 6,904,421 B2 * | 6/2005 | Shetty ......................... 706/13 |

(Continued)

OTHER PUBLICATIONS

Topology design and bandwidth allocation of embedded ATM networks using genetic algorithm; Kit-Sang Tang King-Tim Ko Man, K.F. Sam Kwong Dept. of Electron. Eng., City Univ. of Hong Kong, Kowloon; This paper appears in: Communications Letters, IEEE Publication Date: Jun. 1998 vol. 2, Issue: 6 On pp. 171-173.*

(Continued)

*Primary Examiner*—Salman Ahmed

(57) ABSTRACT

A Path Generator connects to a communication network and uses genetic algorithms to assign flows to paths. Genotypes encode flow to path assignments for working and protection paths. Genotype fitness functions are computed as a weighted sum of constraint fitness functions. Each constraint fitness function evaluates the degrees to which the genotype is a satisfactory solution. The system can be used for network modeling. It can also receive requests for on-demand assignment of flows and on-demand rerouting of flows.

35 Claims, 26 Drawing Sheets

U.S. PATENT DOCUMENTS

| | | | | |
|---|---|---|---|---|
| 6,912,207 | B2* | 6/2005 | Ohnishi et al. | 370/255 |
| 6,912,587 | B1* | 6/2005 | O'Neil | 709/232 |
| 7,092,378 | B1* | 8/2006 | O'Neil | 370/351 |
| 7,230,916 | B2* | 6/2007 | Stamatelakis et al. | 370/227 |
| 7,289,972 | B2* | 10/2007 | Rieser et al. | 706/13 |
| 7,613,165 | B2* | 11/2009 | Shin et al. | 370/351 |
| 2001/0040896 | A1* | 11/2001 | Frouin et al. | 370/466 |
| 2002/0022952 | A1* | 2/2002 | Zager et al. | 703/22 |
| 2002/0054587 | A1* | 5/2002 | Baker et al. | 370/352 |
| 2002/0198694 | A1* | 12/2002 | Yang et al. | 703/6 |
| 2002/0199203 | A1* | 12/2002 | Duffy et al. | 725/109 |
| 2003/0048749 | A1* | 3/2003 | Stamatelakis et al. | 370/225 |
| 2003/0097693 | A1* | 5/2003 | Morohashi et al. | 930/10 |
| 2004/0260813 | A1* | 12/2004 | Heisserman et al. | 709/226 |
| 2005/0216182 | A1* | 9/2005 | Hussain et al. | 701/200 |
| 2007/0115810 | A1* | 5/2007 | Stamatelakis et al. | 370/228 |
| 2009/0083390 | A1* | 3/2009 | Abu-Ghazaleh et al. | 709/209 |
| 2009/0125225 | A1* | 5/2009 | Hussain et al. | 701/200 |

OTHER PUBLICATIONS

Genetic Algorithms for Solving Disjoint PathProblem with Proportional Path-Costs; B Özçam, 2001—lib.ncsu.edu.*

A genetic algorithm for visualizing networks of association rules; F Guillet, P Kuntz, R Lehn—Lecture notes in computer science, 1999.*

A Highly Functional Decision Paradigm Based on Nonlinear Adaptive Genetic Algorithm; A Kostrzewski, J Kim, 1997.*

"An Introduction to Genetic Algorithms," by Scott Austin, Ai Expert, Mar. 1990, pp. 49-53.

"Moody's Evolving Help Desk," by Mark Clarkson, BYTE, Feb. 1995, pp. 76-80.

* cited by examiner

FIG. 5

| FLOW (502) | PATH (504) | SEQUENCE OF NODES AND LINKS (506) |
|---|---|---|
| 401 to 405 | P1 | 401-406-402-408-405 |
| | P2 | 401-409-403-410-405 |
| | P3 | 401-411-404-413-405 |
| | P4 | 401-406-402-407-403-410-405 |
| | P5 | 401-411-404-412-403-410-405 |
| | P6 | 401-406-402-407-403-412-404-413-405 |
| | P7 | 401-411-404-412-403-407-402-408-405 |
| 401 to 404 | P8 | 401-411-404 |
| | P9 | 401-406-402-407-403-412-404 |
| | P10 | 401-406-402-408-405-413-404 |
| | P11 | 401-406-402-408-405-410-403-412-404 |
| | P12 | 401-406-402-407-403-410-405-413-404 |
| | P13 | 401-409-403-410-405-413-404 |
| | P14 | 401-409-403-407-402-408-405-413-404 |
| 402 to 404 | P15 | 402-406-401-411-404 |
| | P16 | 402-407-403-412-404 |
| | P17 | 402-408-405-413-404 |
| | P18 | 402-406-401-409-403-412-404 |
| | P19 | 402-406-401-409-403-410-405-413-404 |
| | P20 | 402-407-403-409-401-411-404 |
| | P21 | 402-407-403-410-405-413-404 |
| | P22 | 402-408-405-410-403-412-404 |
| | P23 | 402-408-405-410-403-409-401-411-404 |

508 → (401 to 405 group)
510 → (401 to 404 group)
512 → (402 to 404 group)

FIG. 12

PATH GENERATOR

Select a link to access a function:

1. Network Models ∼1201
2. Flow Requirements ∼1202
3. Policy Constraints ∼1203
4. Performance and Traffic Measurements ∼1204
5. Genetic Algorithms ∼1205
6. Fitness Functions ∼1206
7. Processes ∼1207
8. Output Reports ∼1208

FIG. 13

NETWORK MODELS

Select a link to access a network model:

1. Asia ∼1301
2. Europe ∼1302
3. North America ∼1303
4. Australia ∼1304

Click here to define a new network model.
    1305

FIG. 15

NETWORK NODE #1

| | | |
|---|---|---|
| ID | 1 | ~1502 |
| Description | Hong Kong | ~1504 |
| Type | Cisco 7500 Router | ~1506 |
| Max Packet/sec | 1000000 | ~1508 |
| Links | L1, L2 | ~1510 |

Click here to update the network node.
~1501

FIG. 16

NETWORK LINK #1

| | | |
|---|---|---|
| ID | 1 | ~1602 |
| Description | Hong Kong – Shanghai | ~1604 |
| Bandwidth | 100 Mbps | ~1606 |
| Delay | 10 msec | ~1608 |
| Jitter | 2 msec | ~1610 |
| Address #1 | 145.16.68.22 | ~1612 |
| Address #2 | 145.16.68.23 | ~1614 |
| Cost | $50000/month | ~1616 |

Click here to update the network link.
~1601

FIG. 17

```
                FLOW REQUIREMENTS

Select a link to access a flow:

1. Hong Kong to Shanghai, 1 Mbps     ~ 1701

2. Hong Kong to Taipei, 10 Mbps      ~ 1702

3. Shanghai to Beijing, 10 Mbps      ~ 1703

4. Taipei to Beijing, 1 Mbps         ~ 1704

5. Hong Kong to Beijing, 0.5 Mbps    ~ 1705

6. Taipei to shanghai, 1.0 Mbps      ~ 1706

7. Beijing to Hong Kong, 0.5 Mbps    ~ 1707

8. Shanghai to Taipei, 1.0 Mbps      ~ 1708

Click here to define a new flow.
      ⌐
      1709
```

FIG. 18

| FLOW REQUIREMENTS #1 | | |
|---|---|---|
| ID | 1 | ~ 1802 |
| Description | Hong Kong to Shanghai, 1 Mbps | ~ 1804 |
| Peak Bandwidth | 1.2 Mbps | ~ 1806 |
| Average Bandwidth | 1.0 Mbps | ~ 1808 |
| Protection Paths | 1 | ~ 1810 |
| Source Address | 10.23.4.58 | ~ 1812 |
| Destination Address | 10.23.59.45 | ~ 1814 |
| Priority | 100 | ~ 1816 |

Click here to update the flow requirements.
　　　1801

FIG. 19

POLICY CONSTRAINTS

Select a link to access a policy:

1. Weekday constraints ~ 1901

2. Saturday constraints ~ 1902

Click here to define a new policy.
　　　1903

*FIG. 20*

| | POLICY CONSTRAINTS #1 | |
|---|---|---|
| ID | 1 | 2002 |
| Description | Weekday constraints | 2004 |
| Flow 1 | Must use link 1 | 2006 |
| Flow 2 | Should use link 2 | 2008 |
| Flow 3 | Must use link 3 | 2010 |
| Flow 4 | Should use link 4 | 2012 |
| Flow 5 | Must use node 2 | 2014 |
| Flow 6 | Should use node 4 | 2016 |
| Flow 7 | Must use link 4, node 3, link 2 | 2018 |
| Flow 8 | Should use node 1 | 2020 |

Click here to update the policy.
2001

FIG. 21

```
                         MEASUREMENTS
Select a link to access a set of performance and traffic measurements:

1. Light traffic  ~ 2101

2. Heavy traffic  ~ 2102

Click here to define a new set of performance and traffic measurements.
      ⌒
     2103
```

FIG. 22

| | MEASUREMENTS #2 | |
|---|---|---|
| ID | 1 | 2202 |
| Description | Light traffic | 2204 |
| Link 1 | Peak bw = 1 Mbs, Average bw = 384 Kbps | 2206 |
| Link 2 | Peak bw = 384 kbps, Average bw = 256 kbps | 2208 |
| Link 3 | Peak bw = 256 kbps, Average bw = 128 kbps | 2210 |
| Link 4 | Peak bw = 500 kbps, Average bw = 300 kbps | 2212 |
| Node 1 | Peak CPU = 75%, Average CPU Utilization = 25% | 2214 |
| Node 2 | Peak CPU = 15%, Average CPU Utilization = 5% | 2216 |
| Node 3 | Peak CPU = 45%, Average CPU Utilization = 44% | 2218 |
| Node 4 | Peak CPU = 25%, Average CPU Utilization = 18% | 2220 |

FIG. 23

| MEASUREMENTS #3 | | |
|---|---|---|
| ID | 1 | ~ 2302 |
| Description | Moderate traffic | ~ 2304 |
| Start Date | 10/02/01 | ~ 2306 |
| Start Time | 3 PM EST | ~ 2308 |
| End Date | 10/02/01 | ~ 2310 |
| End Time | 4 PM EST | ~ 2312 |

Click here to collect the performance and traffic measurements.
      ⌣
     2301

FIG. 24

GENETIC ALGORITHMS

Select a link to access a genetic algorithm:

1. Compute flow-to-path assignments for a fixed network topology (Disconnected) ~2401

2. Compute minimum cost network to satisfy flow requirements (Disconnected)~2402

3. Adapt to network topology changes (Connected) ~2403

4. Adapt to network performance and traffic measurements (Connected) ~2404

Click here to define a new genetic algorithm.
      ⌣
     2405

FIG. 25

```
┌─────────────────────────────────────────────────────────────┐
│                    GENETIC ALGORITHM #1                      │
│  ┌─────────────────────────────────────────────────────────┐ │
│  │ ID          │ 1                                    ├─ 2502
│  │                                                         │ │
│  │ Description │ Compute flow-to-path assignments for a fixed ├─ 2504
│  │             │      network topology (Disconnected)        │ │
│  │                                                         │ │
│  │ Formula     │ FG = 20 * f1( ) + 10 * f2( ) + f3( )  ├─ 2506
│  └─────────────────────────────────────────────────────────┘ │
│                                                              │
│  Click here to update the genetic algorithm.                 │
│       )                                                      │
│     2501                                                     │
└─────────────────────────────────────────────────────────────┘
```

FIG. 26

FITNESS FUNCTIONS

Select a link to access a fitness function:

1. Evaluate utilization of network elements for high priority flows — 2601

2. Evaluate utilization of network elements for medium priority flows — 2602

3. Evaluate utilization of network elements for low priority flows — 2603

4. Evaluate if administrative constraints are satisfied for a flow — 2604

5. Evaluate if nodes and links on an assigned path are not used by another high priority flow — 2605

6. Evaluate if resources used by one flow are mutually exclusive from resources used by a second flow — 2606

*FIG. 27*

FITNESS FUNCTION #1

Description: Evaluate utilization of network elements for high priority flows

```
f1( ) {
  sum = total = 0
  for(each high priority flow) {
    sum = sum + (percent of network elements on assigned path that are not overutilized)/100
    total = total + 1
  }
  if(total == 0)
    return 1
  else
    return (sum)/(total)
}
```

SYSTEM FOR UTILIZING GENETIC ALGORITHM TO PROVIDE CONSTRAINT-BASED ROUTING OF PACKETS IN A COMMUNICATION NETWORK

RELATED APPLICATIONS

This application is a continuation of U.S. patent application Ser. No. 10/012,976, filed on Dec. 10, 2001 now U.S. Pat. No. 7,092,378, which is herein incorporated by reference.

TECHNICAL FIELD OF THE INVENTION

The present invention is directed to a system and method for constraint-based routing in a communication network, and more particularly, to a system and method for utilizing a genetic algorithm to provide constraint-based routing of packets in a communication network.

BACKGROUND OF THE INVENTION

Assigning traffic flows to paths in a network is a complex problem. There are multiple attributes associated with the nodes and links and multiple constraints to be satisfied. Networks of large numbers of nodes, links and flows can provide an enormous number of flow-to-path assignments. Traffic Engineering (TE) in a network is a process of controlling the flows of data packets through the network to optimize the utilization of network resources (e.g., routers, switches, etc.) and to improve the network performance. Traffic engineering selects communication paths in a network to use the network bandwidth efficiently thereby avoiding a situation in which some network resources are overutilized and others are underutilized.

Constraint-Based Routing (CBR) is a TE mechanism for computing a feasible network path based on a traffic description and a set of constraints. While conventional IP routing algorithms (e.g., Bellman-Ford, Dijkstra) find a path that optimizes a scalar metric (e.g., number of hops), CBR finds a path that optimizes a scalar metric and does not violate a set of constraints. For example, link bandwidth may be a constraint in a sense that each of the links in a path selected by the algorithm must have a certain minimum available bandwidth. Administrative policy may be another constraint. A policy may specify that certain traffic may be blocked on some nodes and links or restricted to some nodes and links. CBR may also include a combination of bandwidth and administration policy.

A CBR system may use Multiprotocol Label Switching (MPLS) as a forwarding mechanism. MPLS is an advanced forwarding scheme that extends routing with respect to packet forwarding and path controlling thereby enabling TE. Each MPLS packet has a header that contains labels. Label Switching Routers (LSRs) in a MPLS network examine these labels and make forwarding decisions based on these values. This operation can be done much faster than conventional IP forwarding because it is not necessary to perform a longest prefix match between the destination IP address and the data in the forwarding table as is required in conventional IP forwarding. Instead, label-forwarding tables indicate how incoming packets are processed. Specifically, these tables indicate how to change the label of a packet arriving on one interface before that packet is transmitted on a different interface.

In an MPLS system, packet processing is much faster than conventional IP forwarding and several different paths can be established to route packets from source to destination. Forwarding is no longer limited to destination-based, hop-by-hop decisions. Administrative policy or TE can be used to explicitly define paths for flows in a MPLS system. Furthermore, the assignment of a flow to a path can use complex algorithms without affecting all the LSRs that simply forward packets. The techniques of MPLS are not limited to Internet Protocol (IP) and are applicable to any network layer protocol (e.g., Appletalk, IPX).

Resource Reservation Protocol (RSVP) is a protocol that can be implemented in a MPLS network and provides a general facility for reserving resources for a flow. The quality-of-service (QoS) requirements for a flow determine the resources that must be reserved at each network element along the path assigned to that flow. RSVP operates by using path messages and resv messages. Path messages are transmitted from sender to receiver through intermediate routers. Each router that receives a path message inserts its own IP address in the message before forwarding it to the next router. This design allows any router that receives a path message to know the path back to the sender. A path message also contains information about the traffic characteristics of a flow. Resv messages are transmitted from receiver to sender and reserve the resources that are required for the flow.

Because of the complexity of most communication networks and the infinite number of scenarios of possible traffic patterns on these networks, it is not possible to evaluate all possible routing options within a reasonable period of time. While the above methods are effective in making network routing decisions, methods that have been used to solve other types of complex problems may be adapted to be used to solve network routing issues. For example, genetic algorithms have been used in many types of applications to provide evolutionary search techniques to identify optimal solutions for various applications that encompass complex problems. Genetic algorithms use an iterative refinement technique that evaluates whether one solution is better than another. Further information about genetic algorithms is available in *Handbook of Genetic Algorithms*, Lawrence Davis, Van Nostrand Reinhold, 1991. It is contemplated that applying genetic algorithms to a constraint-based routing scheme may result in a more effective routing mechanism than the current TE techniques.

SUMMARY OF THE INVENTION

The present invention is directed to a system for utilizing a genetic algorithm to provide constraint-based routing of packets in a communication network. The inputs to the system include network topology and capabilities, flow requirements, policy constraints, and performance and traffic measurements. The output from the system is a set of flow to path assignments.

A Path Generator (PG) executes the genetic algorithm. The PG may have a connection to an active network. It may receive requests for on-demand assignment and on-demand rerouting of flows. Alternatively, the PG may operate in stand-alone mode and perform network modeling.

Multi Protocol Label Switching (MPLS) is one technology that can be used with this invention. Label switched paths may be configured in real-time based on commands from a PG.

BRIEF DESCRIPTION OF THE DRAWINGS

The present invention is illustrated by way of example and not limitation in the accompanying figures in which like reference numerals indicate similar elements and in which:

FIG. 5 is a list of possible flow to path assignments for the network of FIG. 4; FIGS. 12-31 are sample Web pages for the Path Generator.

DETAILED DESCRIPTION

Figure 1:
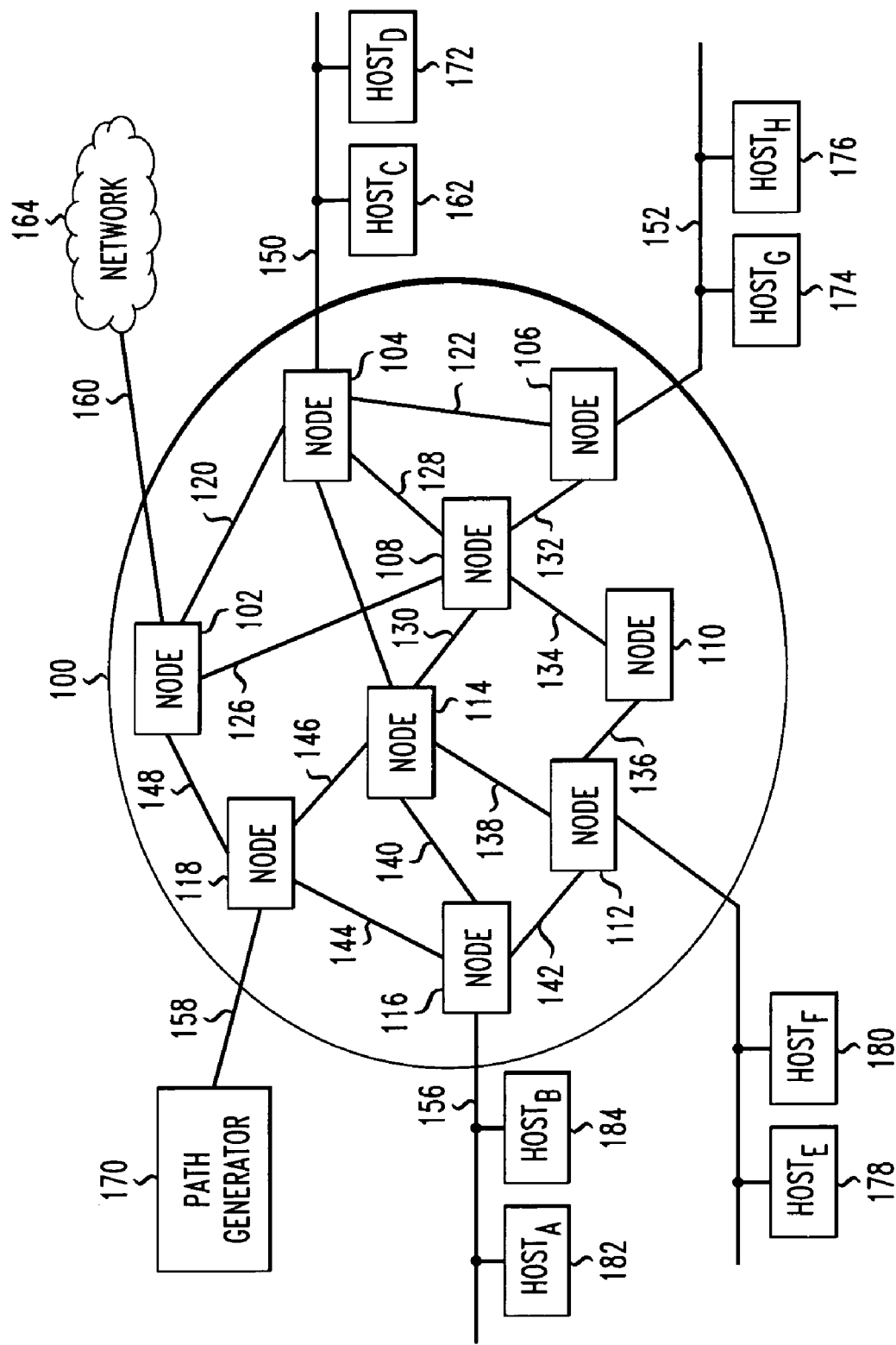
FIG. 1 is a block diagram of a network architecture which includes a path generator for implementing constraint-based routing using genetic algorithms in accordance with the present invention.

Referring to the figures in which like numerals indicate like elements throughout, FIG. 1 illustrates a network architecture for which Constraint-Based Routing (CBR) using genetic algorithms can be used to route traffic through the network. A network 100 comprises a plurality of nodes 102-118 and a plurality of links 120-160. Some of the links (e.g., 120, 124) connect one node to another node (e.g., link 120 connects node 102 to node 104). Other links (e.g., 150, 152) connect a node to one or more host computers (e.g., link 150 connects node 104 to a plurality of host computers 162, 172). The network 100 can also be connected by a link (e.g., link 160) to another network (e.g., network 164). Network 100 can be an Internet Protocol (IP) network, a Multiprotocol Label Switching (MPLS) network or other type of packet network such as an Asynchronous Transfer Mode (ATM) network or frame relay network.

For purposes of discussion, it is assumed that network 100 is a MPLS network. As such, nodes 102-118 are Label Switching Routers (LSRs) and paths that connect any one node to another node (e.g., the path connecting node 102 to node 116 which is defined by node 102 to link 148 to node 118 to link 144 to node 116) are Label Switched Paths (LSPs). Each MPLS packet which is communicated through the network 100 has a header. In a non-ATM environment, the header contains a 20-bit label, a 3-bit experimental field, a 1-bit label stack indicator and an 8-bit time-to-live field. The LSRs examine these labels and make forwarding decisions based on these values. Further information about MPLS networks is available in *MPLS Technology and Applications*, Davis and Rekhter, Morgan Kaufmann Publishers, 2000, which is incorporated by reference.

In accordance with the present invention, a Path Generator (PG) 170 is connected to network 100 via link 158. As will be described in detail hereinafter, PG 170 is an adjunct processor that uses genetic algorithms to evaluate and assign flows to paths, either manually via a system administrator or automatically based on data provided to PG 170 about network 100. Such data may include, but is not limited to, specified requirements for particular flows, network attributes and constraints on network 100 such as bandwidth, cost, reliability and failures. Policy constraints that restrict assignment of flows to various paths are also provided to PG 170. PG 170 can also adaptively provide on-demand assignment of flows based on statistics collected from network 100. PG 170 can also create protection paths in network 100 to ensure routing of high priority communications. PG 170 can assign flows to LSPs. As described in more detail hereinafter, the present invention enhances LSRs such that the LSRs are able to request and receive LSPs from PG 170 when new flows are added to the network. The LSRs are also able to receive commands from PG 170 to create, modify and delete LSPs based on changing conditions in network 100.

In accordance with the present invention, PG 170 can be connected to an active network, as illustrated in FIG. 1 or can be used to design a future network, as will be described later. PG 170 preferably comprises one or more servers which are used to store and evaluate network conditions in order to assign flows based on real-time traffic patterns.

Figure 2:
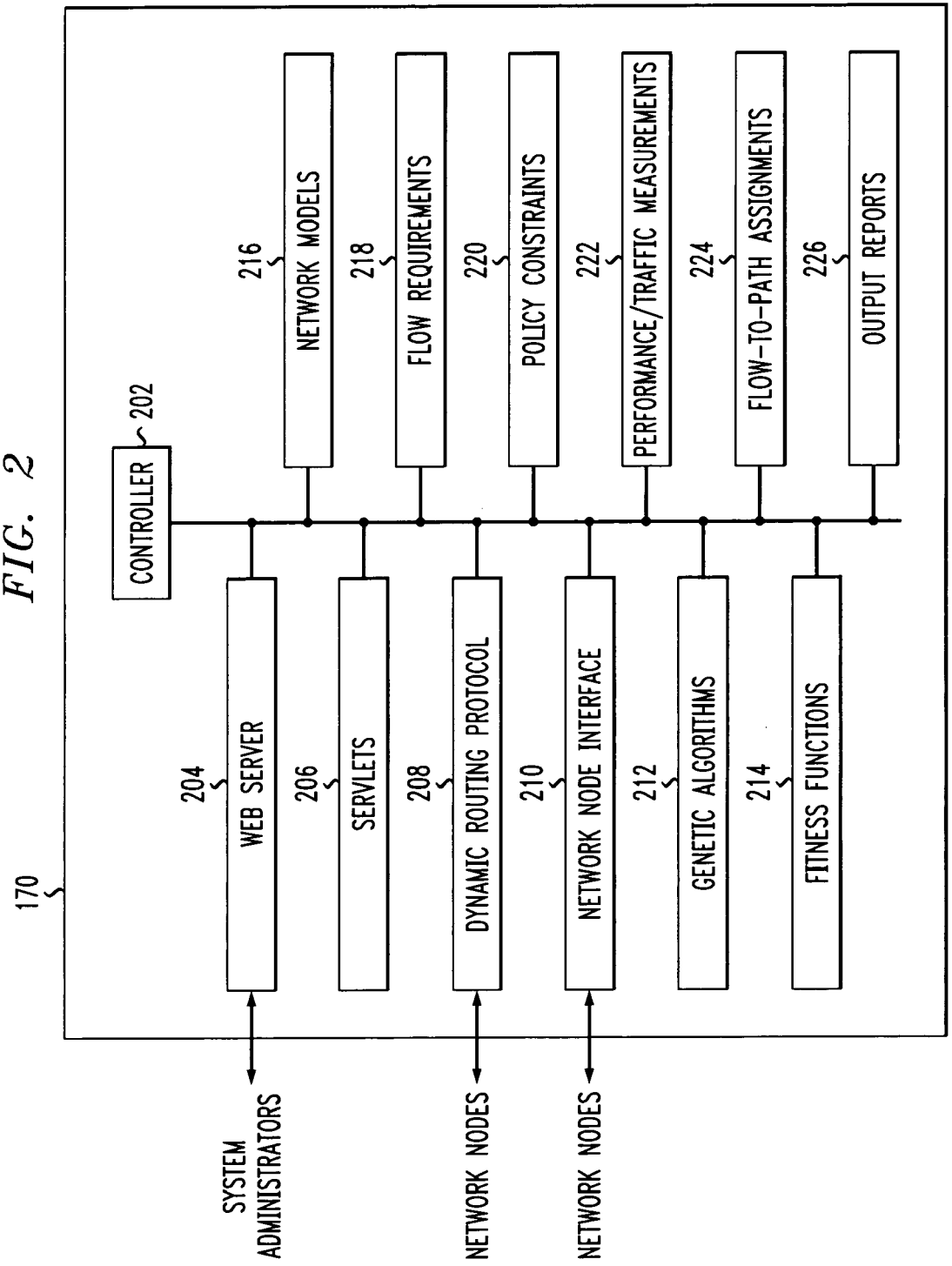
FIG. 2 is a functional block diagram of the path generator of FIG. 1.

FIG. 2 illustrates a functional block diagram of PG 170 which shows the key software components required to implement the features and functionalities described above. The primary component of PG 170 is controller 202 which manages the overall execution of the PG 170. For example, the controller 202 determines which genetic algorithms and fitness functions are executed and when they are invoked. A web server 204 provides a graphical user interface (GUI) for the PG 170 which may be accessed by one or more system administrators in order to interact with PG 170. Many features currently found in GUIs such as, but not limited to, pop-up menus, pull-down menus and drag-and-drop windows are used as will be discussed in detail hereinafter. Servlets 206 contain program logic that are executed by the web server 204 in order to implement the GUI and invoke the controller 202 to process user requests.

A dynamic routing protocol 208 provides PG 170 with information and updates regarding changes to the network topology. Such information could include changes in the network topology due to the addition of links or routers, or loss of links or routers due to a failure in the network. Well-known dynamic routing protocols include Open Shortest Path First (OSPF), Routing Information Protocol (RIP), and Border Gateway Protocol (BGP). A network node interface 210 enables PG 170 to exchange requests and responses with a network node. PG 170 includes one or more databases which contain information which is used as input to the Genetic Algorithms. As shown, databases containing data pertaining to network models 216, flow requirements 218 and policy constraints 220 are illustrated. It is to be understood by those skilled in the art that the number of databases and the specific ways in which the data are arranged are not particular to the present invention.

PG 170 also includes databases for storing the genetic algorithms 212 and fitness functions 214 which are used by PG 170 for the flow-to-path assignments. Another database 222 stores data obtained from the network which relates to performance and traffic measurements for one or more of the network elements. Such measurements may include CPU measurements and link utilization. The outputs obtained by invoking one or more of the genetic algorithms 212 are stored in a flow-to-path assignment database 224 and an output reports database 226.

As indicated above, PG 170 applies Genetic Algorithms (GA) to CBR in order to determine flow-to-path assignments for communications through the network. GAs are general-purpose search algorithms that use principles inspired by natural population genetics to evolve solutions to problems. A population of candidate solutions are maintained and evolved over time through reproduction, crossover and mutation. A Fitness Function (FF) is used to evaluate the candidate solutions. Candidates with the most desirable characteristics are selected from the population. GAs are particularly useful for solving complex problems that involve many variables.

Figure 3:
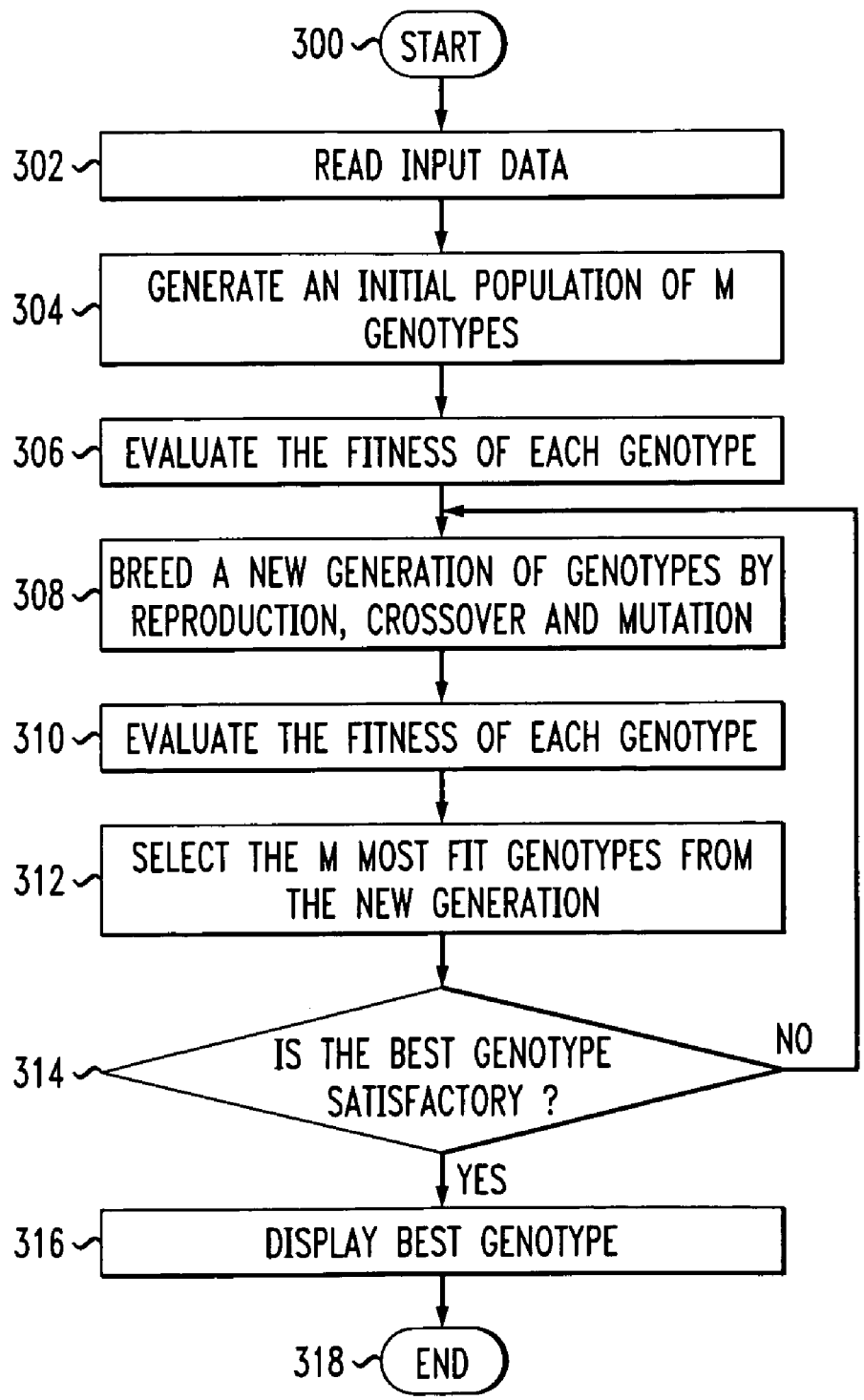
FIG. 3 is a flow chart illustrating the general steps taken in executing a genetic algorithm.

FIG. 3 illustrates the general steps taken in executing a GA. Input data is read (step 302) and an initial population of M genotypes is generated (step 304). A fitness function is applied to determine the fitness of each genotype (step 306). A new generation of genotypes is bred by using reproduction, crossover and mutation (step 308). The fitness of each genotype is again evaluated (step 310). The M most fit genotypes are selected from the new generation (step 312). A determination is made as to whether the best genotype resulting from the previous selection is satisfactory (step 314). If the best genotype is not satisfactory, steps 308-314 are repeated. If the best genotype is satisfactory, the best genotype is displayed (step 316).

In accordance with the present invention, the inputs for the GAs include network topology, network element capabilities, flow requirements, policy constraints and performance/traffic measurements. The network topology inputs relate to the geometric arrangement of links and nodes in a network. Network element capabilities define the link capabilities and node capabilities of the links and nodes in the network. Characteristics associated with link capabilities include bandwidth, delay, jitter, cost, start address and end address. Characteristics associated with node capabilities include maximum throughput through the node which may be expressed as packets/second and maximum number of paths which may be supported by a given node. Flow requirements which may be considered include peak bandwidth, average bandwidth, priority, start address, end address, peak data rate, peak burst size, committed data rate, committed burst size and excess burst size. Policy constraints define which resources (i.e., nodes and links) cannot be used for specific flows. Such constraints can be hard constraints in that no exceptions are permissible or soft constraints that can be ignored under certain circumstances.

Figure 4:
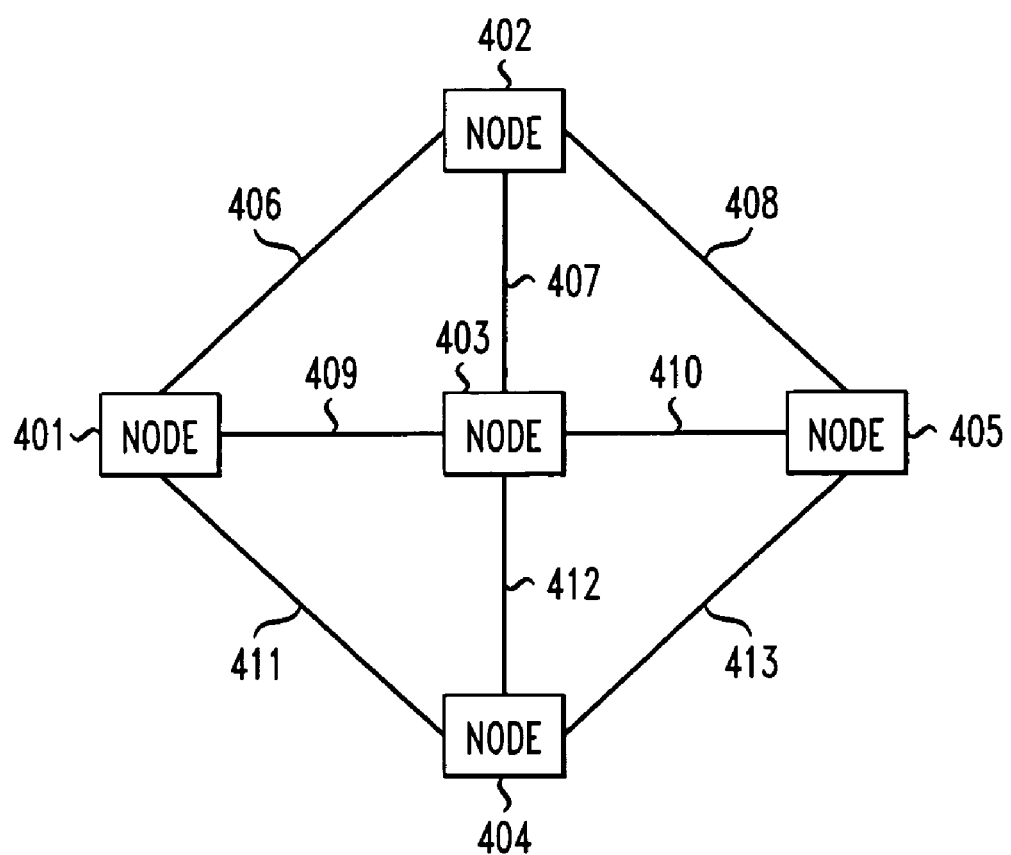
FIG. 4 is a sample network.

A genotype is a sequence of genes that encodes a candidate solution. Each gene assigns a flow to a specific path through the network. FIG. 4 provides a sample network to explain the encoding of a genotype. It shows a network 400 that consists of five nodes 401-405 and eight links 406-413. Assume that three flows (viz. from 401 to 405, from 401 to 404, and from 402 to 404) must be assigned to paths through this network.

FIG. 5 illustrates a table that enumerates all of the candidate paths that can be taken by each of these flows. Each path defines a unique sequence of nodes and links. While the beginning node and end node remain the same for each particular path sequence, the number of intermediate nodes that are assigned to any given path varies. As illustrated in the table, column 502 lists the flows for which the paths are to be defined. Each flow is defined by a beginning node and an end node (e.g., flow 401 to 405 is illustrated in row 508). The paths are then defined in column 504 and given an arbitrary designation (e.g., P1 for the first path of flow 401 to 405). The third column 506 provides the sequence of nodes and links that defines each path identified in column 504. As such path P1 for flow 401 to 405 is defined by the following sequence of nodes and links: 401-406-402-408-405.

The genetic algorithm begins by generating a random set of genotypes and then evolving these genotypes through several generations until a satisfactory solution is identified. Some candidate genotypes are presented in the following list. Each genotype contains three genes. The first gene assigns a path to the first flow. The second gene assigns a path to the second flow. The third gene assigns a path to the third flow. A genotype may specify a NULL path assignment for a flow. This means the flow is not assigned to any path. (This is valuable in cases where a network does not have sufficient capacity to accommodate all flows.)

G1=(P5, P11, P19)
G2=(P3, P9, P15)
G3=(P4, P8, P21)
G4=(P3, P12, P15)
G5=(P7, P10, P16)

Each gene selects one of the paths that may be assigned to that flow. The first gene must assign the first flow to P1-P7 or NULL. The second gene must assign the second flow to P8-P14 or NULL. The third gene must assign the third flow to P15-P23 or NULL.

Three genetic operators are used to evolve this initial population. They are reproduction, crossover, and mutation. Reproduction makes an exact copy of a genotype. Crossover exchanges genes between two genotypes to yield two new genotypes. Mutation changes one or more genes in an existing genotype to yield a new genotype. Mutation ensures that the probability of searching any region of the solution space is never zero.

Consider an example of the crossover operator. Two genotypes such as G4 and G5 are selected and a gene from each of these genotypes is exchanged. In this particular example, the path for the third flow (i.e., P15 and P16) are exchanged. As a result, new genotypes G6 and G7 are created:

G6=(P3, P12, P16)
G7=(P7, P10, P15)

Consider an example of the mutation operator. A genotype such as G2 is selected and a gene from this genotype is modified. In this particular example, the second flow is modified from P9 to P12. A new genotype G8 is created:

G8=(P3, P12, P15)

Members of a population to which these operators are applied are selected stochastically. This means that a member with a higher fitness score has a higher probability of being chosen. However, there is also some randomization in the process so that merely having a higher fitness score does not assure selection.

The fitness of each genotype is calculated by a genotype fitness function. Let FG equal the fitness function for genotype G. This function returns a numeric value that represents the match between the flow requirements, network capabilities, and policy constraints. Higher fitness values represent higher fitness.

A genotype fitness function is calculated as a weighted sum of several constraint fitness functions. Each constraint fitness function returns a numeric value between 0 and 1, inclusive. That value represents the degree to which one or more constraints is satisfied by genotype G.

The general form of a genotype fitness function is shown below:

$$FG = a1*f1( ) + a2*f2( ) + \ldots + ac*fc( ) \quad (1)$$

where FG is a genotype fitness function; and
f1( ), f2( )-fc( ) are constraint fitness functions.

Each constraint fitness function is multiplied by a coefficient. Coefficients a1, a2, and ac are used to scale the output of the constraint fitness functions. In this manner, the relative importance of each constraint fitness function can be adjusted. This provides considerable flexibility for calculating a genotype fitness function.

Consider an example of a genotype fitness function. Assume that there are ten flows (three high priority, two medium priority, and five low priority) that must be assigned to paths. Let f1( ) be the constraint fitness function for high priority flows. Let f2( ) be the constraint fitness function for medium priority flows. Let f3( ) be the constraint fitness function for low priority flows. A possible genotype fitness function is shown below:

$$FG=10*f1()+5*f2()+f3() \qquad (2)$$

The fitness of high priority flows is given more weight than the fitness of medium priority flows. Similarly, the fitness of medium priority flows is given more weight than the fitness of low priority flows.

A possible constraint fitness function for high priority flows is outlined in the following listing. The path assignments for the high priority flows are examined. The percent of the network elements on the assigned path that are not overloaded is computed. A higher value means more fitness. Constraint fitness functions for medium and low priority flows are analogous in structure.

To determine if a network node is overloaded, the processor utilization of that node can be measured periodically (e.g. every 30 seconds). These measurements can be used to compute an average processor utilization (e.g. for the last 10 minutes). If the average value is above a configured threshold (e.g. 70%), the node is overloaded.

To determine if a network link is overloaded, a similar procedure can be employed. The average utilization of that link can be computed. If the average value is above a configured threshold, the link is overloaded.

The logic of the function is: (a) Variables sum and total are initialized to zero. (b) For each high priority flow, the percent of network elements on the assigned path that are not overloaded is computed. The percent value is divided by 100 and added to variable sum. This variable represents the degree to which network elements on the assigned paths for high priority flows are not overloaded. The variable total equals the number of high priority flows. It is incremented by one for each high priority flow. (c) The return value of the function is computed by dividing sum by total. The result is between 0 and 1. A value of zero indicates that all network elements on all assigned paths for all high priority flows are overloaded. A value of one indicates that all network elements on all assigned paths for all high priority flows are not overloaded.

```
f( ) {
  sum=total=0
  for(each high priority flow) {
    sum=sum+
      (percent of network elements on assigned path that
        are not overloaded)/100
    total=total+1
  }
  if(total==0) {
    return 1
  }
  else {
    return sum/total
  }
}
```

Consider another example of a constraint fitness function. Assume that there are ten flows (three high priority, two medium priority, and five low priority) that must be assigned to paths. Let f1( )-f3( ) be the constraint fitness functions as described for the previous example. In addition, let f4( ) be a constraint fitness function for policy constraints. A possible genotype fitness function is shown below:

$$FG=10*f1()+5*f2()+f3()+20*f4() \qquad (3)$$

The coefficient applied to f4( ) is much greater than that applied to the other constraint fitness functions. Therefore, a genotype that satisfies the policy constraints has much higher fitness than others that do not satisfy those constraints.

A possible constraint fitness function for policy is outlined in the following listing. The path assignments for each flow are examined. The percent of the network elements on the assigned path that satisfy the policy constraints is computed. A higher value means more fitness.

The logic of the function is: (a) Variables sum and total are initialized to zero. (b) For each flow, the percent of network elements on the assigned path that satisfy policy constraints is computed. The percent value is divided by 100 and added to variable sum. This variable represents the degree to which network elements on the assigned paths satisfy policy constraints. The variable total equals the number of flows. It is incremented by one for each flow. (c) The return value of the function is computed by dividing sum by total. The result is between 0 and 1. A value of zero indicates that all network elements on all assigned paths do not satisfy policy constraints. A value of one indicates that all network elements on all assigned paths do satisfy policy constraints.

```
f( ) {
  sum=total=0
  for(each flow) {
    sum=sum+
      (percent of network elements on assigned path that
        satisfy policy constraints)/100
    total=total+1
  }
  if(total==0) {
    return 1
  }
  else {
    return sum/total
  }
}
```

Another constraint fitness function is shown in the following listing. It determines the degree to which a genotype uses mutually exclusive paths for high priority flows. Such a genotype has greater fitness because it is more fault-tolerant than a genotype in which high priority flows share the same path.

The logic of the function is: (a) Variables sum and total are initialized to zero. (b) For each high priority flow, the percent of network elements on the assigned path that are not used by another high priority flow is computed. The percent value is divided by 100 and added to variable sum. This variable represents the degree to which network elements on the assigned paths for high priority flows are not shared. The variable total equals the number of high priority flows. It is incremented by one for each high priority flow. (c) The return value of the function is computed by dividing sum by total. The result is between 0 and 1. A value of zero indicates that all network elements on all assigned paths for all high priority flows are shared. A value of one indicates that all network elements on all assigned paths for all high priority flows are not shared.

```
f( ) {
  sum=total=0
  for(each high priority flow) {
    sum=sum+
      (percent of nodes and links on assigned path that are
        not used by another high priority flow)/100
    total=total+1
  }
  if(total==0) {
    return 1
  }
  else {
    return sum/total}
  }
}
```

Another constraint fitness function is shown in the following listing. It evaluates the degree to which the paths for two specific flows, flow1 and flow2, use mutually exclusive resources.

The logic of the function is: (a) Variables sum and total are initialized to zero. (b) For each network element used by flow1, the number of network elements not used by flow2 is computed. The variable sum equals the number of network elements that are used by flow1 but are not used by flow2. The variable total equals the number of network elements used by flow1. (c) The return value of the function is computed by dividing sum by total. The result is between 0 and 1. A value of zero indicates that all network elements on the assigned path for flow1 are also used for flow2. A value of one indicates that none of the network elements on the assigned path for flow1 are also used for flow2.

```
f( ) {
sum=total=0
for(each network element used by flow1) {
    if(the network element is not used by flow2) {
        sum=sum+1
    }
    total=total+1
}
if(total==0) {
    return 1
}
else {
    return sum/total}
}
}
```

The constraint fitness function shown in the following listing can be multiplied by a coefficient that expresses the importance of the constraint. In this manner, a constraint can be either soft (e.g. flow1 and flow2 should use mutually exclusive resources) or hard (viz. flow1 and flow2 must use mutually exclusive resources). The same constraint fitness function can be used. However, the return value from this function can be multiplied by a much larger coefficient for a hard constraint than for a soft constraint.

A PG may also be used to determine the minimum number of network links that are needed to satisfy flow requirements, policy constraints, and traffic demand for a given set of network nodes. This would be done when the PG operates in disconnected mode (i.e. without a connection to a network).

The following fitness function evaluates the percentage of possible network links that are not used by any flow. Links that are not used by any flow need not be installed. Therefore, the cost of these links can be saved. The following listing shows a fitness function that evaluates the number of links that are not used by a genotype.

The logic of the function is: (a) Variables sum and total are initialized to zero. (b) For each link in the network model, the number of links not used by any flow is computed. The variable sum equals the number of links in the network model that are not used by any flow. The variable total equals the number of links in the network model. (c) The return value of the function is computed by dividing sum by total. The result is between 0 and 1. A value of zero indicates that none of the links in the network model are used. A value of one indicates that all of the links in the network model are used.

```
f( ) {
sum=total=0
for(each link in the network model) {
    if(link is not used by any flow) {
        sum=sum+1
    }
    total=total+1
}
if(total=0) {
    return 1
}
else {
    return sum/total}
}
}
```

The following fitness function evaluates the percentage of possible link cost that is used for flows. The objective is to maximize the cost of links that are not used.

The logic of the function is: (a) Variables sum and total are initialized to zero. (b) For each link in the network model, the cost of the links not used by any flow is computed. The variable sum equals the cost of links in the network model that are not used by any flow. The variable total equals the cost of the links in the network model. (c) The return value of the function is computed by dividing sum by total. The result is between 0 and 1. A value of zero indicates that none of links in the network model is used. A value of one indicates that all of the links in the network model are used.

```
f( ) {
sum=total=0
for(each link in the network model) {
    if(link is not used by any flow) {
        sum=sum+(cost of link)
    }
    total=total+(cost of link)
}
if(total=0) {
    return 1
}
else {
    return sum/total}
}
}
```

These examples indicate that a rich variety of constraint fitness functions can be designed. They can be used to evaluate a genotype from many different perspectives.

Application Scenarios

The PG in this invention can be used in several application scenarios: (1) network modeling, (2) hybrid (manual assignment of some flows by system administrator, automatic assignment of other flows by a PG), (3) adaptive (performance/traffic measurements are collected from the network and provide input to the PG), (4) on-demand assignment of flows to paths, and (5) selection of protection paths. Each of these application scenarios is considered in the following sections.

Network Modeling

A PG can be used as a stand-alone modeling tool. It provides a user interface that allows a planner to provide input data for the tool. This data includes network topology, network element capabilities, flow requirements, policy constraints, and performance and traffic measurements. Priority and bandwidth can be specified for each flow. For example, a flow that transports video information would typically be assigned higher priority than a flow that transports electronic mail. The modeling tool can extract network topology and network element capabilities from an existing network and use this as input to the genetic algorithm. This can be done via a dynamic routing protocol. Alternatively, the data can be read directly from network nodes. The PG processes this input data and assigns flows to paths through the network.

A modeling tool can operate in phases. For example: (1) Map high priority flows to paths. (2) Map medium priority flows to paths. (3) Map low priority flows to paths. The advantage of this strategy is that it allows a user to review the assignment of high priority flows to the network topology. This first phase can be computed in less time than would be required to map all flows. A user can then manually adjust the assignments made by the tool before proceeding to the next phase.

Figure 6A:
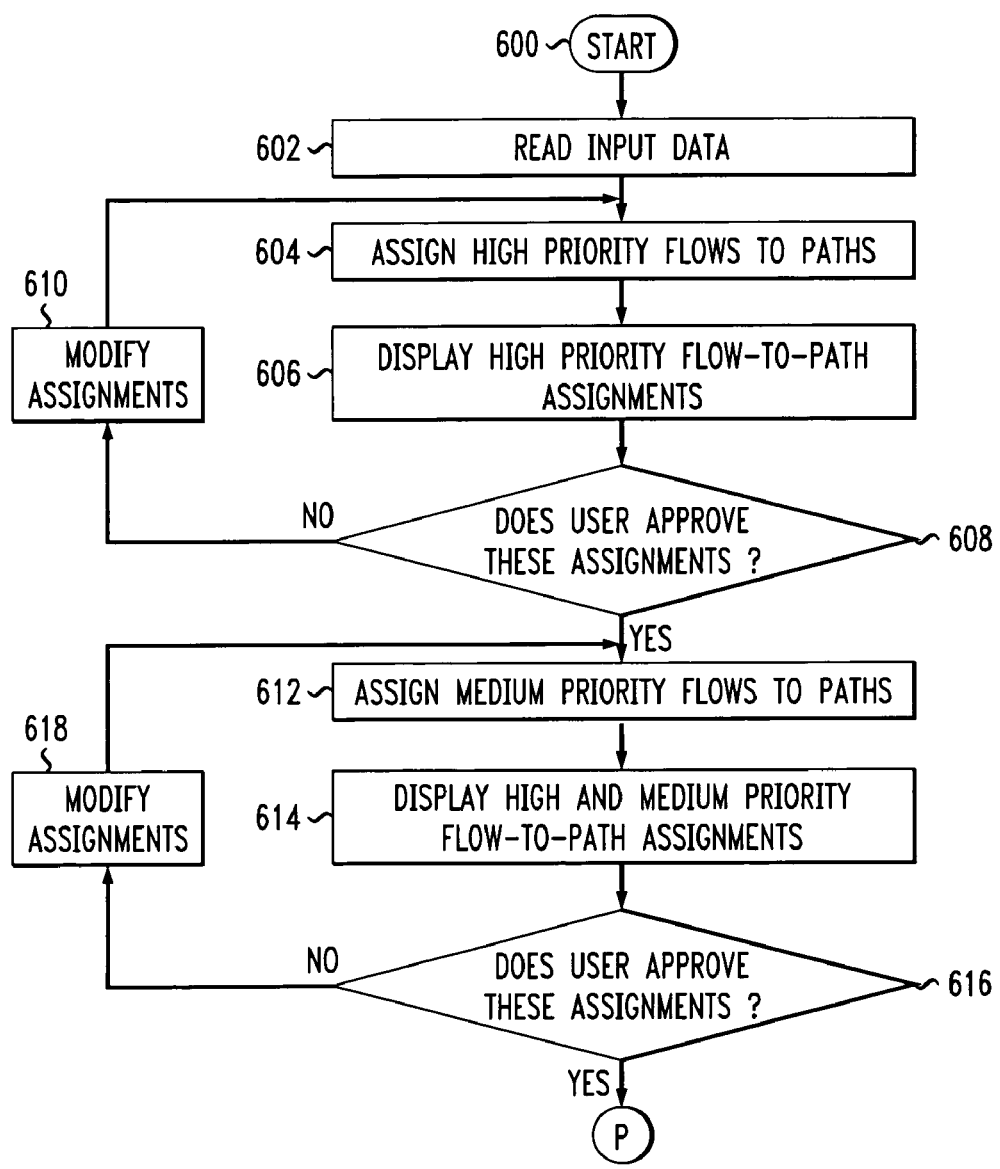
FIGS. 6A-6B are flowcharts for the network modeling application scenario.
Figure 6B:
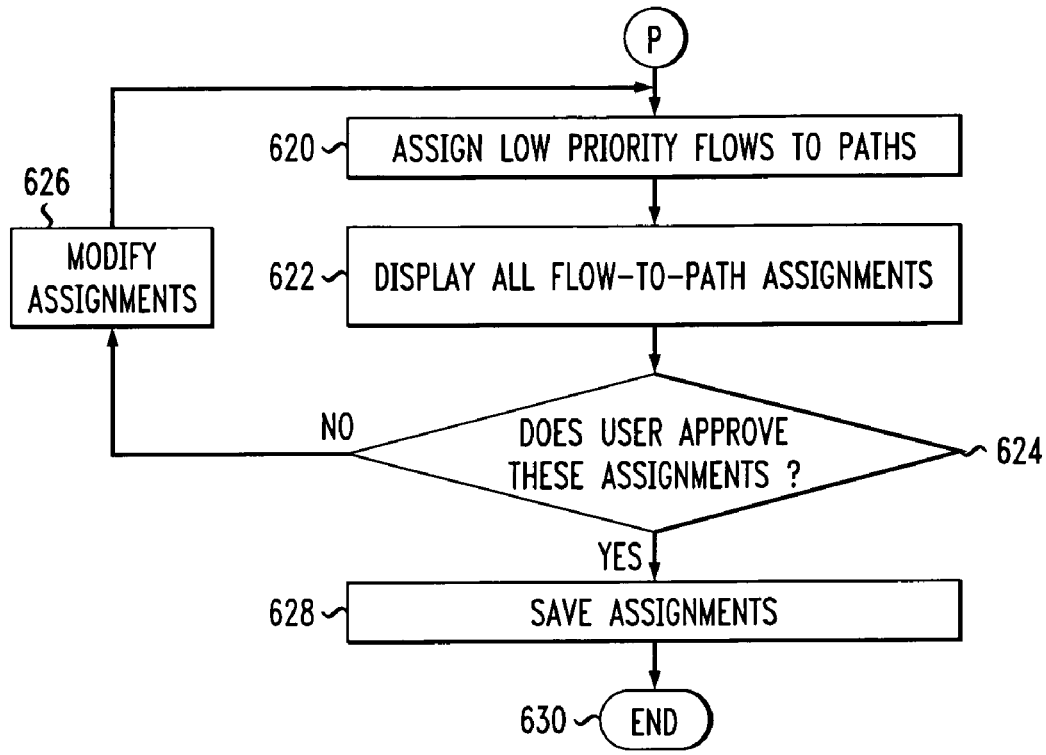

FIGS. 6A-6B show a flowchart for a genetic algorithm that operates in three phases to assign high, medium, and low priority flows to paths. After each phase, the user of the modeling tool may review the assignments via a graphical user interface. An example of such an interface is provided later in this specification. If the assignments are satisfactory, the user of the modeling tool may issue a command to continue execution at the next phase. Otherwise, the assignments may be manually modified before proceeding to the next phase.

There are many criteria that can be used to evaluate if a set of flow to path assignments are satisfactory. For example, a user may examine how high priority flows are assigned. If these flows use mutually exclusive resources, this could be regarded as an excellent set of assignments. However, if the high priority flows share resources, this could be regarded as an unsatisfactory set of assignments because the proposed solution is not as fault tolerant. The solutions proposed by a genetic algorithm are often a compromise between multiple criteria (e.g. reliability, cost). Therefore, a system that allows a user to review, approve, and modify these assignments via a graphical user interface has significant benefits.

Execution starts (step 600). The input data (i.e. network topology, network element capabilities, flow requirements, policy constraints, and performance and traffic measurements) is read (step 602). High priority flows are assigned to paths (step 604). The genotype encodes only high priority flow to path assignments. The encoding of genotypes is described later in this specification. The high priority assignments are displayed (step 606). The user reviews and may approve these assignments (step 608). If the assignments are not satisfactory, they may be modified (step 610) and execution continues (step 604). If the assignments are satisfactory, the medium priority flows are assigned to paths (step 612). The high and medium priority assignments are displayed (step 614). The genotype size is increased to encode both high and medium priority flow to path assignments. The user reviews and may approve these assignments (step 616). If the assignments are not satisfactory, they may be modified (step 618) and execution continues (step 612). If the assignments are satisfactory, execution proceeds to point P.

The low priority flows are assigned to paths (step 620). All assignments are displayed (step 622). The genotype size is increased to encode all flow to path assignments. The user reviews and may approve these assignments (step 624). If the assignments are not satisfactory, they may be modified (step 626) and execution continues (step 620). If the assignments are satisfactory, the assignments are saved in an output report (step 628) and execution stops (step 630).

The flow to path assignments produced by the network modeling tool can be downloaded to the network nodes. The user may than use measurement tools in the current art to evaluate if the flow-to-path assignments are satisfactory. More information about these measurement tools can be found at http://www.cisco.com.

Hybrid

A PG can provide a graphical user interface that allows a system administrator to manually assign some flows to specific paths. The remaining flow-to-path assignments are computed via a genetic algorithm. The PG can then issues commands to network nodes to implement these assignments.

For example, a system administrator may wish to manually assign high priority flows to specific nodes and links. A PG can then automatically assign lower priority flows to paths. In this application scenario, the genetic algorithm is modified so some flow to path assignments are fixed and others are evolved to find a satisfactory solution. Consider the genotype shown below:

G=(path12, path17, path21, ... )

Flows 1-3 are manually assigned to paths 12, 17, and 21, respectively. The PG then completes all remaining assignments.

Adaptive

Performance and traffic measurements can be collected from network nodes and transmitted to a PG. The PG can use this information to periodically evaluate the fitness of genotypes.

Figure 7:
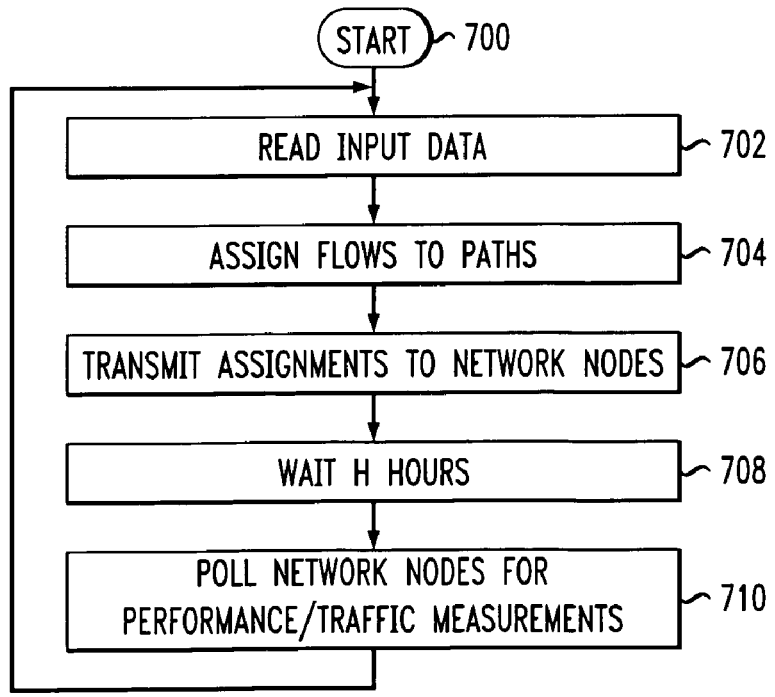
FIG. 7 is a flowchart for the adaptive application scenario.

FIG. 7 shows a flowchart that outlines the operation of the PG in adaptive mode. Execution starts (step 700). Input data (i.e. network topology, network element capabilities, flow requirements, policy constraints, and performance and traffic measurements) is read (step 702). Assignments of flows to paths are performed by using the techniques previously described in this specification (step 704). The assignments are transmitted to the network nodes (step 706). The PG waits for H hours (step 708). This allows the network to operate with the new assignments. The network nodes are polled for performance and traffic measurements (step 710). Once this process is completed, additional input is read and the process is repeated (step 702).

The constraint fitness function shown in the following listing evaluates the degree to which the CPU utilization of each node is below 50%. The logic of the function is: (a) Variables sum and total are initialized to zero. (b) For each node in the network model, each CPU utilization measurement is evaluated. If that CPU utilization measurement is less than 50%, sum is incremented by one. The variable total equals the total number of measurements for all network modes. (c) The return value of the function is computed by dividing sum by total. The result is between 0 and 1. A value of zero indicates that none of the CPU utilization measurements is less than 50%. A value of one indicates that all of the CPU utilization measurements are less than 50%.

```
f( ) {
sum=total=0
for(each network node) {
   for(each measurement) {
      if(average CPU utilization <50%) {
         sum=sum+1
      }
      total=total+1
   }
}
if(total==0) {
   return 1
}
else {
   return sum/total}
}
}
```

On-Demand Assignment of Flows

A PG can perform on-demand assignment of flows. Assume that a new flow enters a network. The ingress node issues a request to a PG. This request contains the destination, bandwidth, priority, and reliability for the flow. The PG uses this data to assign the flow to a path via the techniques previously described in this specification.

There are two alternatives by which the PG can implement this assignment. These are depicted in FIGS. 8 and 9.

Figure 8:
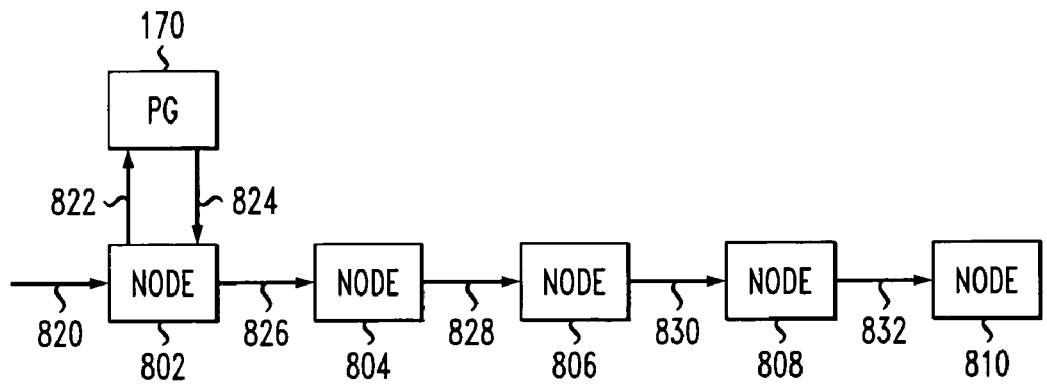
FIGS. 8-9 are diagrams for the on-demand assignment of flows.
Figure 9:
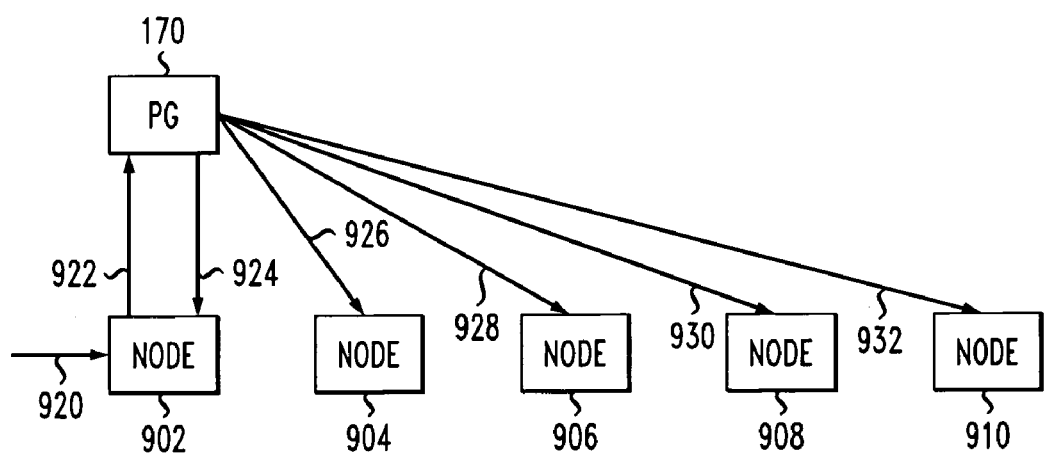

FIG. 8 shows a network with nodes 802-810 and PG 170. A flow 820 arrives at node 802. There is no path assigned to that flow. The node 802 sends a request 822 to the PG 170. The request includes the requirements for the flow (viz. destination, bandwidth, priority, and reliability). The PG 170 assigns a path to that flow. The PG 170 transmits a response 824 to the node 802. This response includes the data that the node requires to create that flow. For example, an Explicit Route Object can be used in an RSVP message to establish a label switched path in an MPLS network as described in RFC 2205 "Resource Reservation Protocol (RSVP) Version 1 Functional Specification" at ieff.org which is incorporated by reference. Path setup messages 826, 828, 830, and 832 are propagated to nodes 804, 806, 808, and 810, respectively.

Alternatively, a Path Generator may transmit commands to individual network elements. FIG. 9 shows a network with nodes 902-910 and PG 170. A flow 920 arrives at node 902. There is no path assigned to that flow. The node 902 sends a request 922 to the PG. The request includes the flow requirements (viz. destination, bandwidth, priority, and reliability). The PG 170 assigns a path to that flow. The PG transmits commands 924, 926, 928, 930, and 932 to nodes 902, 904, 906, 908, and 910, respectively. The PG can use the Simple Network Management Protocol (SNMP) to transmit these commands to the nodes as described in RFC 1157 "Simple Network Management Protocol (SNMP)" which is incorporated by reference.

Figures 10, 11:
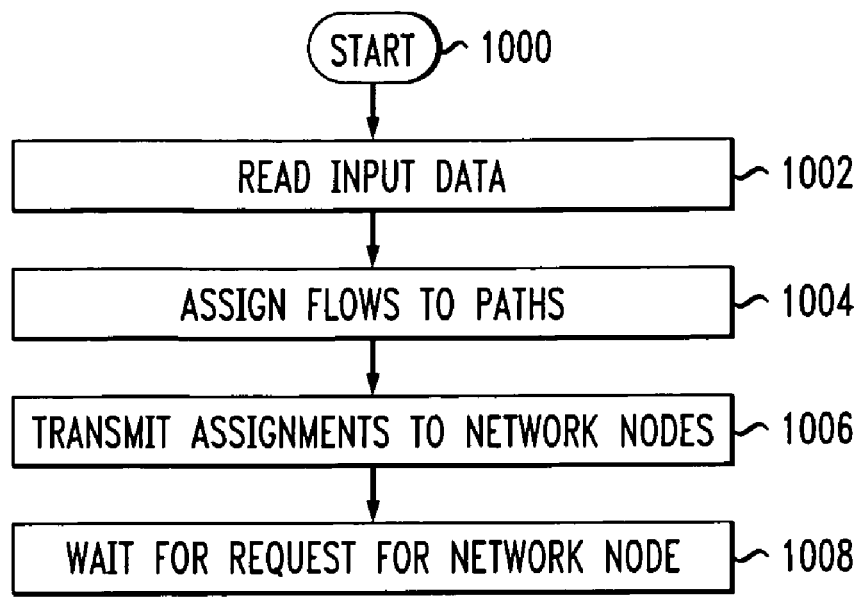
FIG. 10 is a flowchart for on-demand assignment of flows.
FIG. 11 is a sample Genotype Format Table.

FIG. 10 shows a flowchart for the on-demand assignment of flows. Execution starts (step 1000). Input data (viz. network topology, network node capacity, flow requirements, policy constraints, and performance and traffic measurements) is read (step 1002) and flows are assigned to paths by using the techniques periodically outlined in this specification (step 1004). The assignments are transmitted to the network nodes (step 1006). The system waits for a request from a network node (step 1008). Such a request is generated by a network node when a new flow arrives and must be assigned to a path. When a new flow is received, the process is repeated and input data for the new flow is read (step 1002).

Selection of Protection Paths

If a network element fails, it takes time to select and setup alternate paths for the flows that use those network elements. This delay may lead to large data losses. This is particularly true at high link speeds. Therefore, a network designer or system administrator may specify protection requirements for each flow. For example, it can be specified that one or more protection paths should be assigned to a flow. A working path normally carries the data for a flow. A protection path carries the data for a flow if one or more network elements along the working path fail.

The protection requirements for a flow can specify that there be several protection paths for that flow. This would be valuable for high priority flows. Assume that a high priority flow has one working path and two protection paths. If the working path and the first protection path fail, the flow can be assigned to the second protection path.

The network elements used for a protection path and its corresponding working path should be mutually exclusive (except for the source and destination nodes). This ensures that failures along a working path do not also affect the protection path.

Previous sections of this specification described how a flow to working path assignment is encoded in a genotype. Gene N describes the assignment of flow N to a working path. This encoding scheme must be extended to specify how flows are assigned to protection paths. One gene is added for each flow to protection path assignment.

Assume that there are four flows and flows 3-4 require protection. A sample genotype is shown below:

G=(path42, path23, path14, path33, path11, path22)

Here, flows 1-4 are assigned to path42, path23, path14, and path33, respectively. Flows 1-2 do not require protection. The protection paths for flows 3-4 are path11 and path22, respectively.

The resources used by path11 should be mutually exclusive from the resources used by path14 (except for the source and destination nodes). Similarly, the resources used by path22 should be mutually exclusive from the resources used by path33 (except for the source and destination nodes). This ensures that failures of network elements along a working path do not affect the corresponding protection path.

Another possible genotype is shown below:

G=(path42, path23, path14, path33, path17, path17)

Here, path 17 is used as the protection path for flow3 and flow4. The resources used by path17 should be mutually exclusive from the resources used by path14 and path33 (except for the source and destination nodes). This ensures that failures of network elements along a working path do not affect the corresponding protection path.

FIG. 11 shows a sample Genotype Format Table that defines the meanings of the genes that constitute a genotype. This table defines the meaning of each gene in the genotype. It is required so fitness functions can correctly interpret the content of a genotype.

The sample data in FIG. 11 show that the first four rows 1102-1108 specify flow to working path assignments for flows 1-4. The last two rows 1110-1112 specify flow to protection path assignments for flows 3-4. For example, the first gene specifies the working path for flow 1 and the last gene specifies a protection path for flow 4.

Constraint fitness functions may evaluate the flow to protection path assignments specified by a genotype. The function shown in the following listing examines all flow to protection path assignments defined by a genotype. It evaluates the degree to which the protection and working paths for each of these flows use mutually exclusive resources.

The logic of the function is: (a) Variables sum and total are initialized to zero. (b) For each flow to protection path assignment, each network element (except the start and end node) in the protection path is examined. If the network element is not used in either the working path or another protection path for the flow, sum is incremented by one. The variable total equals the number of flow to protection path assignments. (c) The return value of the function is computed by dividing sum by total. The result is between 0 and 1. A value of zero indicates that the working and protection paths for each flow use the same network elements A value of one indicates that the working and protection paths for each flow use mutually exclusive network elements (except for the start and end nodes).

```
f( ) {
  sum=total=0
  for(each flow to protection path assignment) {
    for(each network element in the protection path except
        the start and end node) {
      if(the network element is not used in the working path
          for the flow) {
        if(the network element is not used in another pro-
            tection path for the flow) {
          sum=sum+1
        }
      }
      total=total+1
    }
  }
  if(total==0) {
    return 1
  }
  else {
    return sum/total}
  }
}
```

The constraint fitness function shown in the following listing examines all flow to protection path assignments defined by a genotype. It evaluates the degree to which the resources on the protection paths are not overloaded. (An algorithm to determine if a network element is overloaded was described earlier in this specification.)

The logic of the function is: (a) Variables sum and total are initialized to zero. (b) For each flow to protection path assignment, each network element in the protection path is evaluated. If the network element is not overloaded, sum is incremented by one. The variable total equals the number of flow to protection path assignments. (c) The return value of the function is computed by dividing sum by total. The result is between 0 and 1. A value of zero indicates that all of the network elements for all protection paths are overloaded. A value of one indicates that none of the network elements for any protection paths are overloaded.

```
f( ) {
  sum=total=0
  for(each flow to protection path assignment) {
    for(each network element in the protection path for that
        flow) {
      if(the network element is not overloaded) {
        sum=sum+1
      }
      total=total+1
    }
  }
  if(total==0) {
    return 1
  }
  else {
    return sum/total}
  }
}
```

The following constraint fitness function computes the percentage of high priority flows for which protection paths exist.

The logic of the function is: (a) Variables sum and total are initialized to zero. (b) For each high priority flow, the variable sum is incremented by one if a protection path exists for that flow. The variable total equals the number of high priority flows. (c) The return value of the function is computed by dividing sum by total. The result is between 0 and 1. A value of zero indicates that none of the high priority flows have protection paths. A value of one indicates that all of the high priority flows have protection paths.

```
f( ) {
  sum=total=0
  for(each high priority flow) {
    if(a protection path exists for that flow) {
      sum=sum+1
    }
    total=total+1
  }
  if(total==0) {
    return 1
  }
  else {
    return sum/total
  }
}
```

The following constraint fitness function evaluates the degree to which a genotype protects high priority flows against single node failures.

The logic of the function is: (a) Variables sum and total are initialized to zero. (b) For each node, each high priority flow through the node is examined. If a protection path that does not use the node exists for that flow, the variable sum is incremented. The variable total equals the number of high priority flows through the node. (c) The return value of the function is computed by dividing sum by total. The result is between 0 and 1. A value of zero indicates that no high priority flows are protected against single node failures. A value of one indicates that all high priority flows are protected against single node failures.

```
f( ) {
  sum=total=0
  for(each node) {
    for(each high priority flow through the node) {
      if(a protection path that does not use the node exists
          for the flow) {
        sum=sum+1
      }
      total=total+1
    }
  }
  if(total==0) {
    return 1
  }
  else {
    return sum/total}
  }
}
```

These examples indicate that a rich variety of constraint fitness functions can be design to evaluate genotypes that contain protection paths.

Path Generator Web Interface

The PG provides a Web interface for its users. This section briefly describes exemplary views for the primary pages. The descriptions are not limiting in scope. Those skilled in the current art can provide enhancements to these pages.

FIG. 12 shows the home page. It allows a user to select one of the eight functions provided by the PG. These are: (1) define network models, (2) define flow requirements, (3) define policy constraints, (4) collect performance and traffic measurements, (5) define genetic algorithms, (6) define fitness functions, (7) start processes to execute genetic algorithms, and (8) examine output reports created by processes. Each of these functions is represented as a hyperlink 1201-1208.

FIG. 13 shows a page that lists all network models. It is obtained by selecting the hyperlink 1201 on FIG. 12. The page contains a hyperlink 1301-1304 for each network model (viz. Asia, Europe, North America, and Australia). A hyperlink 1305 at the bottom of the page allows a user to define a new network model.

Figure 14:
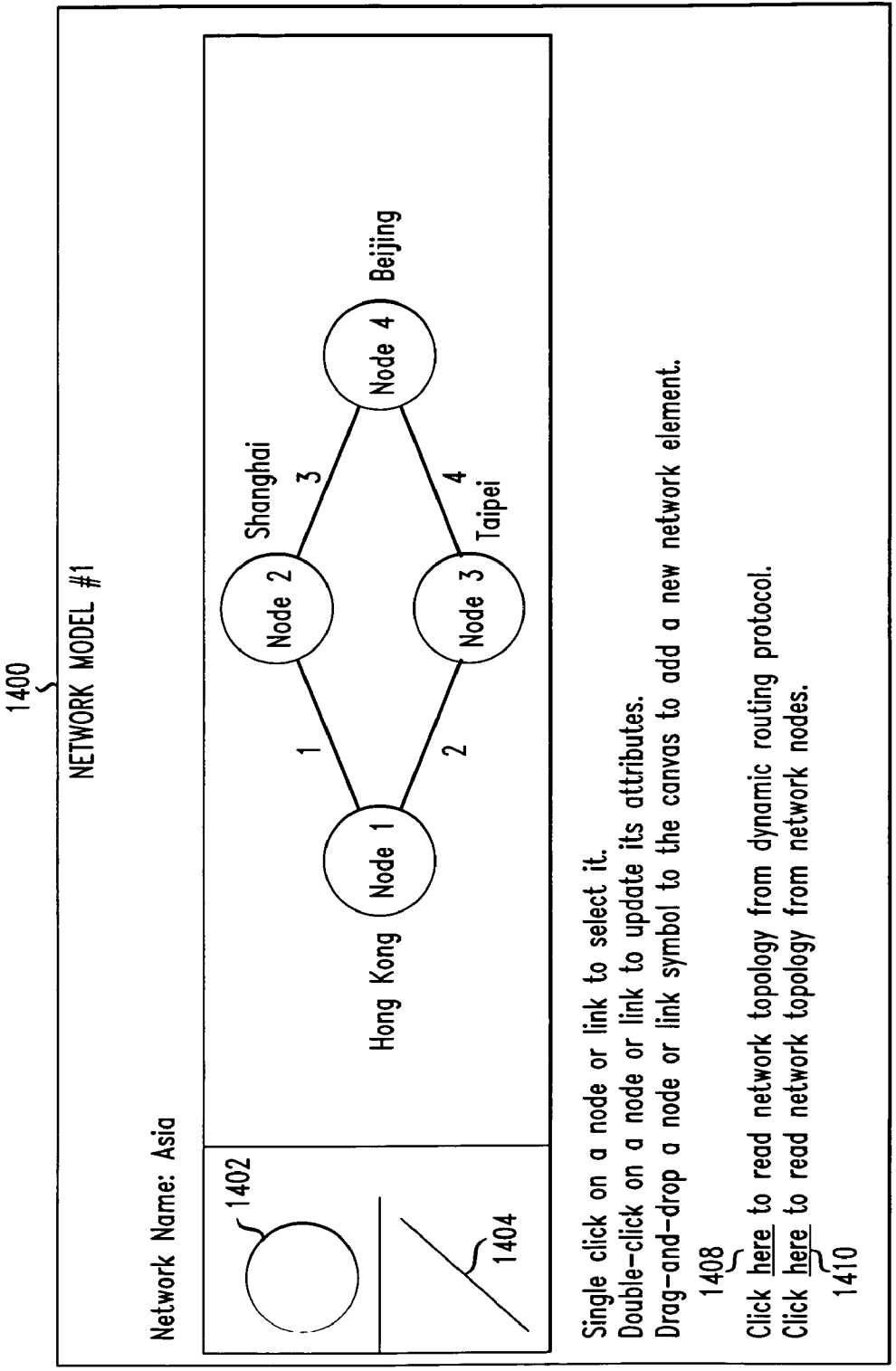

FIG. 14 shows a page for the Asia network model. It is obtained by selecting the hyperlink 1301 on FIG. 13. The page provides a canvas 1406 on which nodes and links may be placed. To add a node to the network, a user selects the icon 1402 and drags it into position on the canvas 1406. To add a link to the network, a user selects the icon 1404 and drags it into position on the canvas 1406.

A user may select a node or link on the canvas via a single click. The network element may then be deleted or dragged into a new position. A user may update the attributes of a network element via a double click.

Two hyperlinks at the bottom of the page allow a user to initialize a model from an existing network. The first hyperlink 1408 allows the network topology to be read via a dynamic routing protocol such as OSPF or BGP. The second hyperlink 1410 allows the network topology to be read by uploading configuration data from the network nodes.

FIG. 15 shows a network node page. It is obtained by double clicking the node 1 circle in 1406. The page reports the node ID 1502, description 1504, type 1506, maximum packets/sec 1508, and the links 1510 that connect to that node. A hyperlink 1501 at the bottom of the page allows a user to update the network node.

FIG. 16 shows a network link page. It is obtained by double clicking the link between node 1 and node 2 in 1406. The page reports the link ID 1602, description 1604, bandwidth 1606, delay 1608, jitter 1610, endpoint addresses 1612, 1614, and cost of the link 1616. A hyperlink 1601 at the bottom of the page allows a user to update the network link.

FIG. 17 shows a page that lists all flow requirements. It is obtained by selecting the hyperlink 1202 on FIG. 12. The page contains a hyperlink 1701-1708 for each flow requirement. Each flow requirement is identified by a starting point, an end point and the transmission speed. A hyperlink 1709 at the bottom of the page allows a user to define a new flow requirement.

FIG. 18 shows a flow requirements page. It is obtained by selecting the hyperlink 1701 on FIG. 17. The page reports the flow requirements ID 1802, description 1804, peak bandwidth 1806, average bandwidth 1808, protection paths 1810, source address 1812, destination address 1814, and priority 1816. These values specify the requirements for the 1 Mbps flow from Hong Kong to Shanghai. A hyperlink 1801 at the bottom of the page allows a user to update the flow requirements.

FIG. 19 shows a page that lists all sets of policy constraints. It is obtained by selecting the hyperlink 1203 on FIG. 12. The page contains a hyperlink for each policy. The first policy defines constraints for weekdays. The second policy defines constraints for Saturday. A hyperlink 1903 at the bottom of the page allows a user to define a new policy.

FIG. 20 shows a policy constraints page. It is obtained by selecting the hyperlink 1901 on FIG. 19. The page defines the policy ID 2002, description 2004, and constraints for several flows as depicted by flows 1-8 (2006-2020). A hyperlink 2001 at the bottom of the page allows a user to update the policy.

FIG. 21 shows a page that lists all sets of measurements. It is obtained by selecting the hyperlink 1204 on FIG. 12. The page contains a hyperlink for each set of performance and traffic measurements. The hyperlink 2101 provides access to measurements collected during light traffic. The hyperlink 2102 provides access to measurements collected during heavy traffic. A hyperlink 2103 at the bottom of the page allows a user to define the start and end of a traffic measurement interval.

FIG. 22 shows a page that displays one set of performance and traffic measurements. It is obtained by selecting the hyperlink 2101 on FIG. 21. The page displays a measurements ID 2202 and description 2204. For each network link, the peak and average bandwidth are reported. As depicted in FIG. 22, the peak and average bandwidths for links 1-4 are reported (2206-2212). For each network node, the peak and average CPU are reported. As depicted in FIG. 22, the peak and average CPUs for nodes 1-4 are reported (2214-2220). Performance and traffic measurements may be collected from network elements by techniques in the current art. Such techniques are provided by companies such as Cisco and organizations such as the Cooperative Associated for Internet Data Analysis (CAIDA) and are described at cisco.com and at caida.org.

FIG. 23 shows a page that allows a user to define a new measurement interval. It is obtained by selecting the hyperlink 2103 on FIG. 21. The next available ID 2302 automatically appears on the page. The user must then enter a description of the interval 2304, the start date 2306, start time 2308, end date 2310, and end time 2312. A hyperlink 2301 at the bottom of the page is then selected to collect the performance and traffic measurements.

FIG. 24 shows a page that lists all genetic algorithms. It is obtained by selecting the hyperlink 1205 on FIG. 12. The page contains a hyperlink 2401-2404 for each GA. The first hyperlink 2401 references a genetic algorithm that computes flow to path assignments for a fixed network topology in disconnected mode. In disconnected mode, the PG 170 is not connected to the network 100. The second hyperlink 2402 references a genetic algorithm that computes a minimum cost network to satisfy flow requirements in disconnected mode. The third hyperlink 2403 references a genetic algorithm that adapts to network topology changes. The algorithm collects the information it requires in connected mode. In connected mode, the PG 170 is connected to the network 100 by link 158. The fourth hyperlink 2404 references a genetic algorithm that adapts to network performance and traffic measurements. The algorithm collects the information it requires in connected mode. A hyperlink 2405 at the bottom of the page allows a user to define a new GA.

FIG. 25 shows a page that displays one genetic algorithm. It is obtained by selecting the hyperlink 2401 on FIG. 24. It displays an ID 2502, description 2504, and a formula 2506 for a genotype fitness function. The formula invokes fitness functions. The user may change the description and/or formula and select the hyperlink 2501 at the bottom of the page to update the GA.

FIG. 26 shows a page that lists all fitness functions. It is obtained by selecting the hyperlink 1206 on FIG. 12. The page contains a hyperlink 2601-2606 for each fitness function. The page provides access to a set of predefined fitness functions.

FIG. 27 shows a fitness function page. It is obtained by selecting the hyperlink 2601 on FIG. 26. It briefly describes the purpose of the fitness function and outlines the code for that function.

Figure 28:
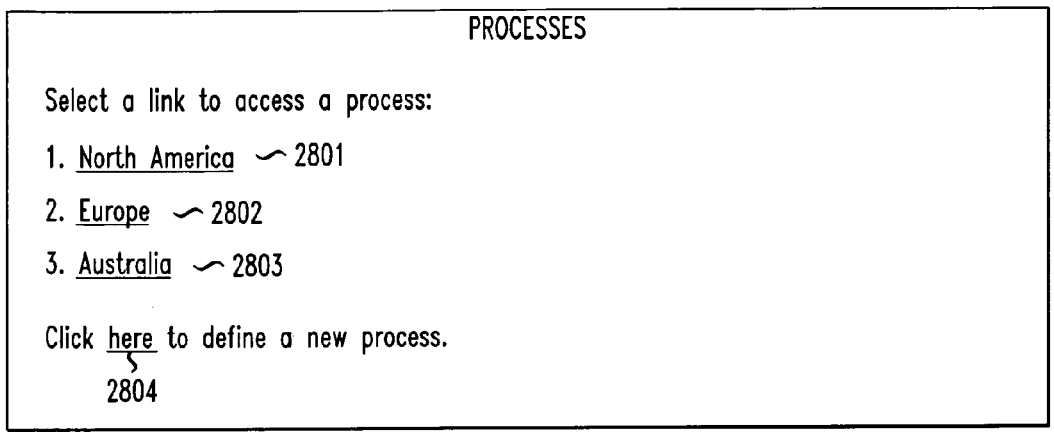

FIG. 28 shows the Processes page. It is obtained by selecting the hyperlink 1207 on FIG. 12. The page contains one hyperlink for each process. As depicted in FIG. 28, a hyperlink is presented for processes in North America 2801, Europe 2802, and Australia 2803. These hyperlinks provide access to the output report that is generated by each process. The last hyperlink 2804 on the page allows a user to define a new process.

Figure 29:
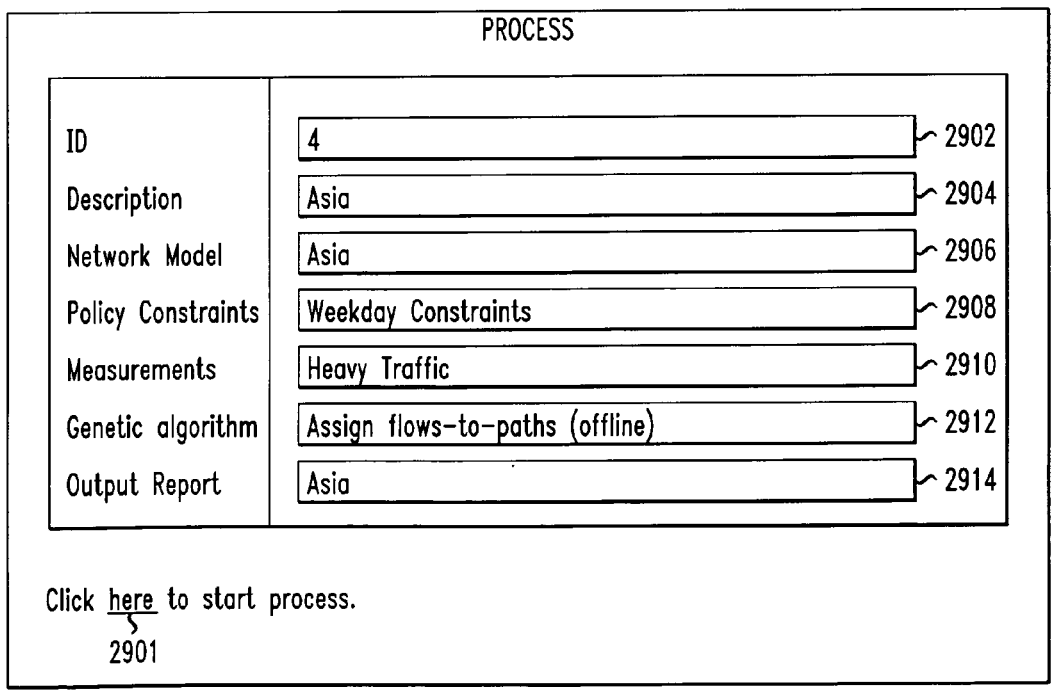

FIG. 29 shows the page to define a new process. It is obtained by selecting the hyperlink 2804 on FIG. 28. The ID 2902 is assigned by the system. The description 2904 is a simple text string to identify the process. The network model 2906, policy constraints 2908, measurements 2910, and genetic algorithm 2912 are chosen via drop-down boxes. The output report 2914 is the name of the output file. The hyperlink 2901 at the bottom of the page allows a user to start the process.

Figure 30:
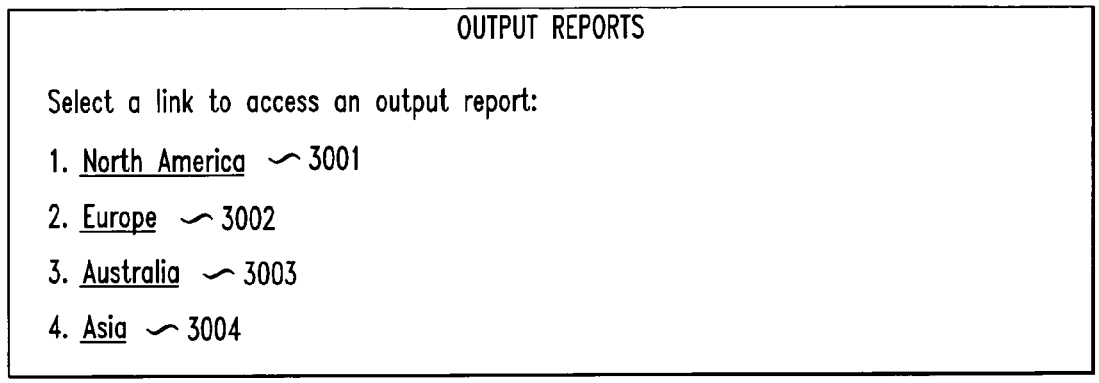

FIG. 30 shows a page that lists all output reports that are created by processes. It is obtained by selecting the hyperlink 1208 on FIG. 12. The page contains one hyperlink for each output report. The string for the hyperlink indicates the name of the process (viz. North America, Europe, Australia Network, and Asia). As depicted in FIG. 30, there are four hyperlinks illustrated, which if activated will allow a user to access one of four output reports: North America 3001, Europe 3002, Australia 3003 and Asia 3004.

Figure 31:
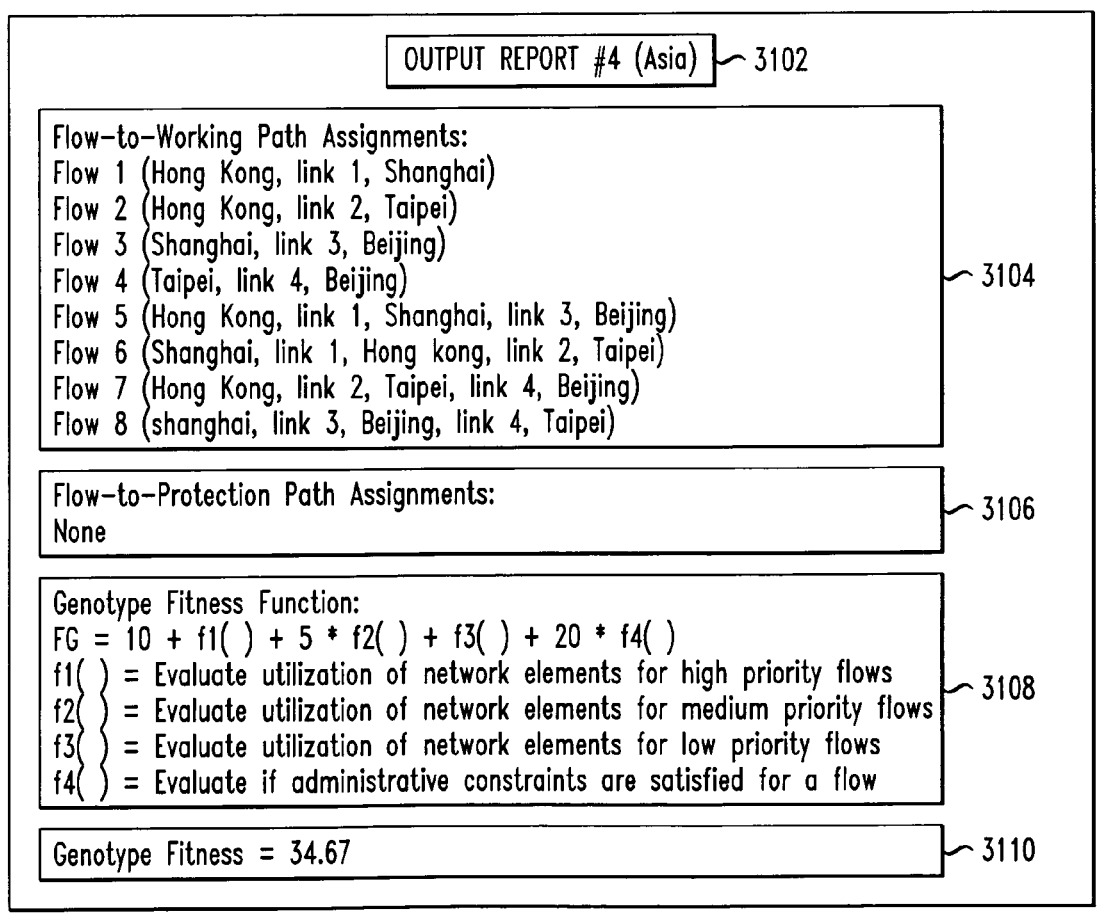

FIG. 31 shows an output report page for the Asia process. It is obtained by selecting the hyperlink 3004 on FIG. 30. The page displays the process name 3102, flow to working path assignments 3104, flow to protection path assignments 3106, genotype fitness function 3108, and final genotype fitness 3110.

FIGS. 12-31 demonstrate only some of the pages that can be provided by the Web server 204. Examples of other features that can be provided include: downloading flow to path assignments to network nodes, adding new fitness functions, and sending output reports via email. The graphical user interface can be enhanced to provide a hybrid application scenario. This would allow some of the flow to path assignments to be done manually. A genetic algorithm can then compute other assignments. It can also be possible for a genetic algorithm to operate in phases. At the completion of each phase, the user can be prompted to review and approve the assignments before proceeding to the next phase.

Controller

The Controller 202 manages the overall execution of the Path Generator 170. For example, the Controller determines which genetic algorithms and fitness functions are executed and when they are invoked. Users submit commands via a graphical user interface to the Web server 204. The Web server receives a command and invokes a servlet 206. The servlet contains the program logic to invoke the Controller.

The commands that a servlet may invoke on the Controller include: (a) view process, (2)-start process, (3) stop process, (4) view blocked process, (5) resume blocked process, (6) add/change/delete network model, (7) add/change/delete flow requirements, (8) add/change/delete policy constraints, (9) add/change/delete genetic algorithms, (10) display fitness function, (11) display/delete output report, or (12) download flow-to-path assignments to network nodes.

Figure 32A:
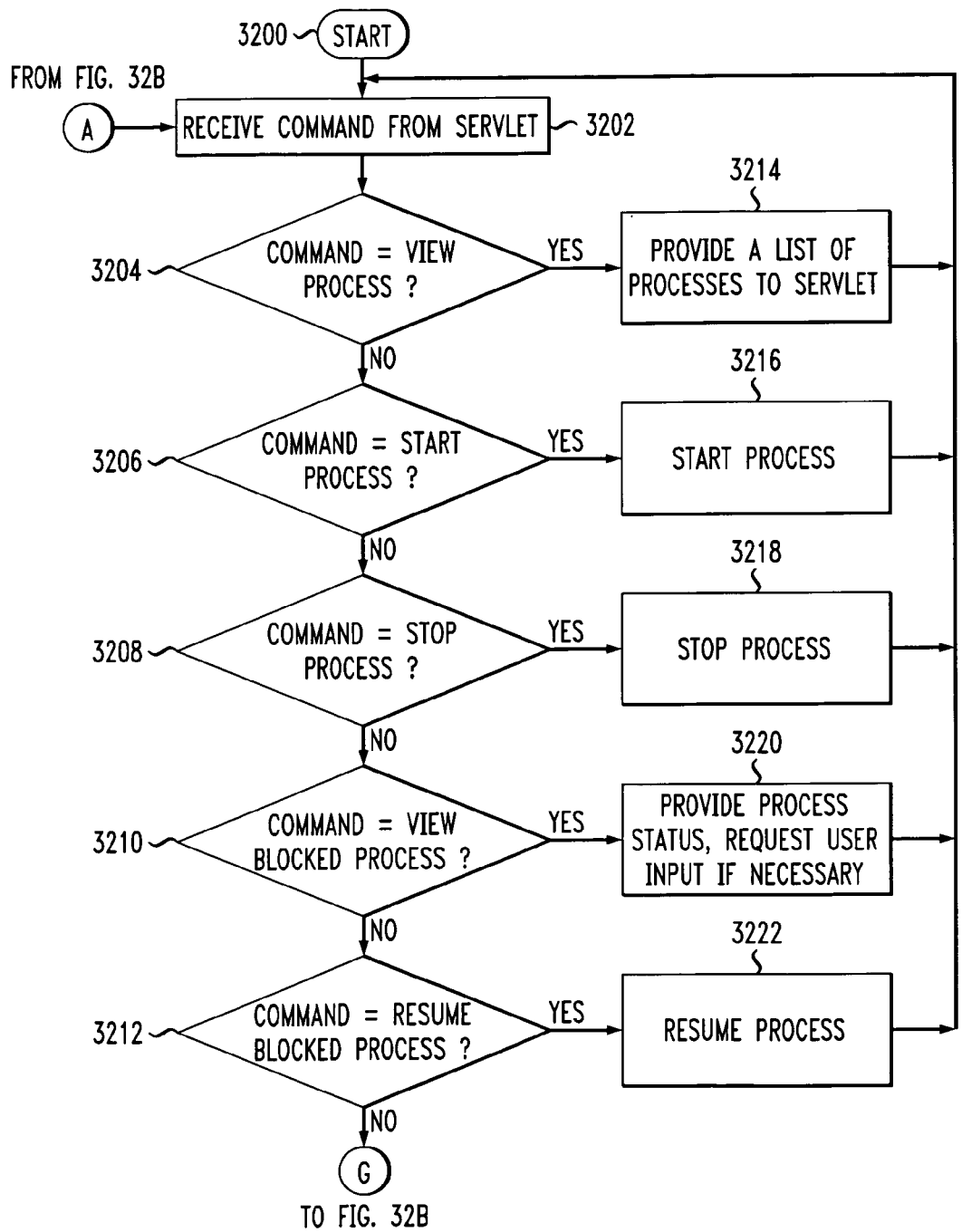
FIGS. 32A-32B are flowcharts for the Controller.
Figure 32B:
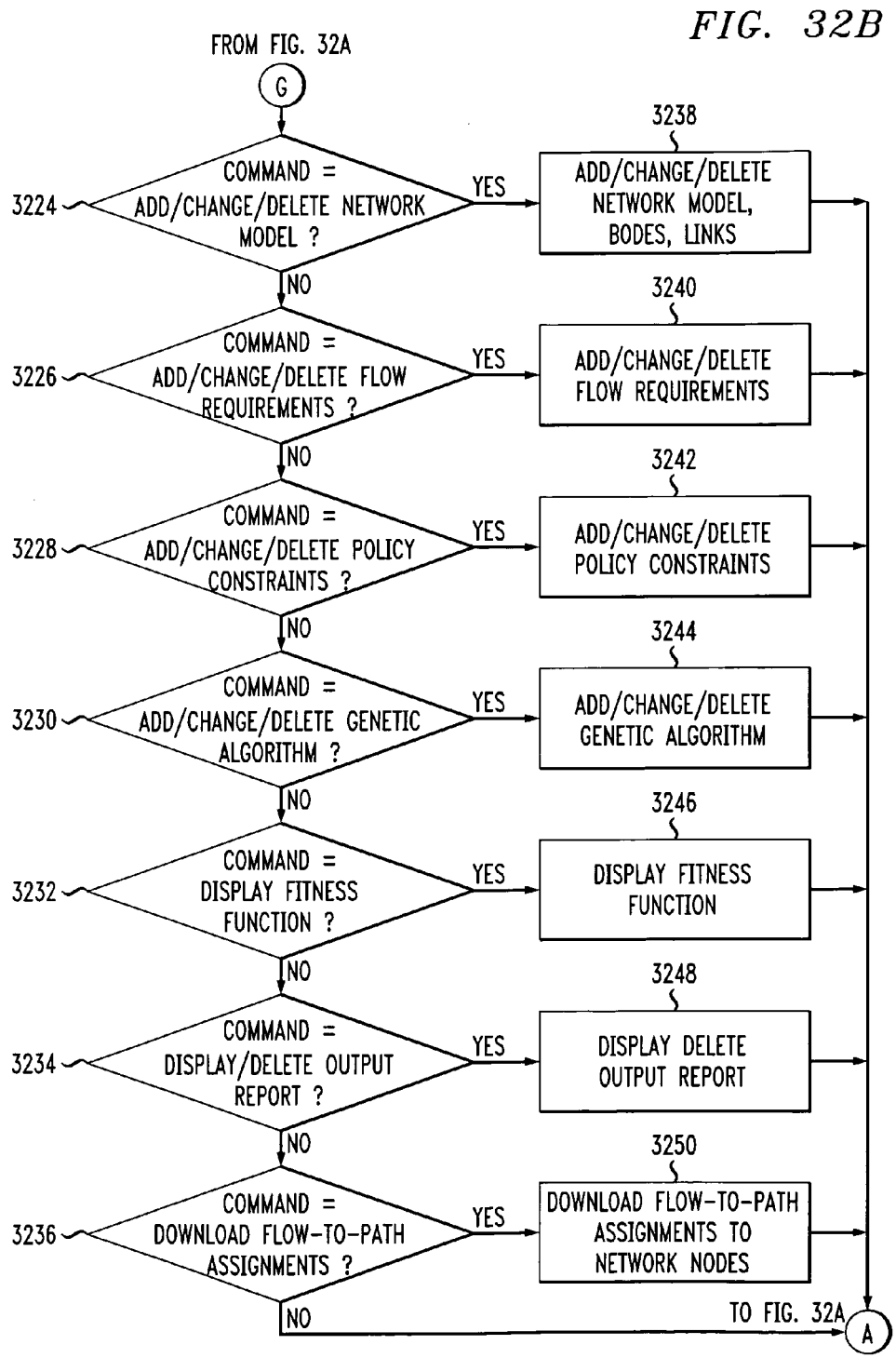

FIGS. 32A-32B show a flowchart for the Controller. Execution begins at 3200. The controller waits for commands from servlets (step 3202). A test is done to determine if the command is to view processes (step 3204). If yes, the command is executed and the processes are viewed (step 3214). If a test is not to be performed, a test is done to determine if the command is to start a process (step 3206). If yes, the command is executed and the process is started (step 3216). If a test is not performed, a test is done to determine if the command is to stop a process (step 3208). If yes, the command is executed and the process is stopped (step 3218). If the test is not performed, a test is done to determine if the command is to view a blocked process (step 3210). If yes, the command is executed and the process status is provided and user input is requested, if necessary (step 3220). If the test is not performed, a test is done to determine if the command is to resume a blocked process (step 3212). If yes, the command is executed and the process is resumed (step 3222). If the test is not performed, execution proceeds to point G.

As illustrated in FIG. 32B, a test is done to determine if the command is to add, change, or delete a network model (step 3224). If yes, the command is executed and the network model, links and nodes are added, changed or deleted (step 3238). If the test is not performed, a test is done to determine if the command is to add, change, or delete flow requirements (step 3226). If yes, the command is executed and the flow requirements are added, changed or deleted (step 3240). If the test is not performed, a test is done to determine if the command is to add, change, or delete policy constraints (step 3228). If yes, the command is executed and the policy constraints are added, changed or deleted (step 3242). If the test is not performed, a test is done to determine if the command is to add, change, or delete a genetic algorithm (step 3230). If yes, the command is executed and the genetic algorithm is added, changed or deleted (step 3244). If the test is not performed, a test is done to determine if the command is to display a fitness function (step 3232). If yes, the command is executed and the fitness function is displayed (step 3246). If the test is not performed, a test is done to determine if the command is to display or delete an output report (step 3234). If yes, the command is executed and the output report is displayed or deleted (step 3248). If the test is not performed, a test is done to determine if the command is to download flow to path assignments (step 3236). If yes, the command is executed and the flow to path assignments are downloaded to the network nodes (step 3250). In all cases execution continues at point A.

Network Node Enhancements

In accordance with the present invention, network nodes must include two capabilities not found in conventional network nodes. First, they must request and receive flow to path assignments from a PG. Second, they must receive commands from a PG to add, modify, or delete flow to path assignments. Commands may be sent to a network node via several techniques in the current art. For example, the Simple Network Management Protocol (SNMP) can be used to transmit a command to a node. See ietf.org for more information. Alternatively, the Common Object Request Broker (CORBA) architecture can be used. See omg.orq for more information.

Figure 33:
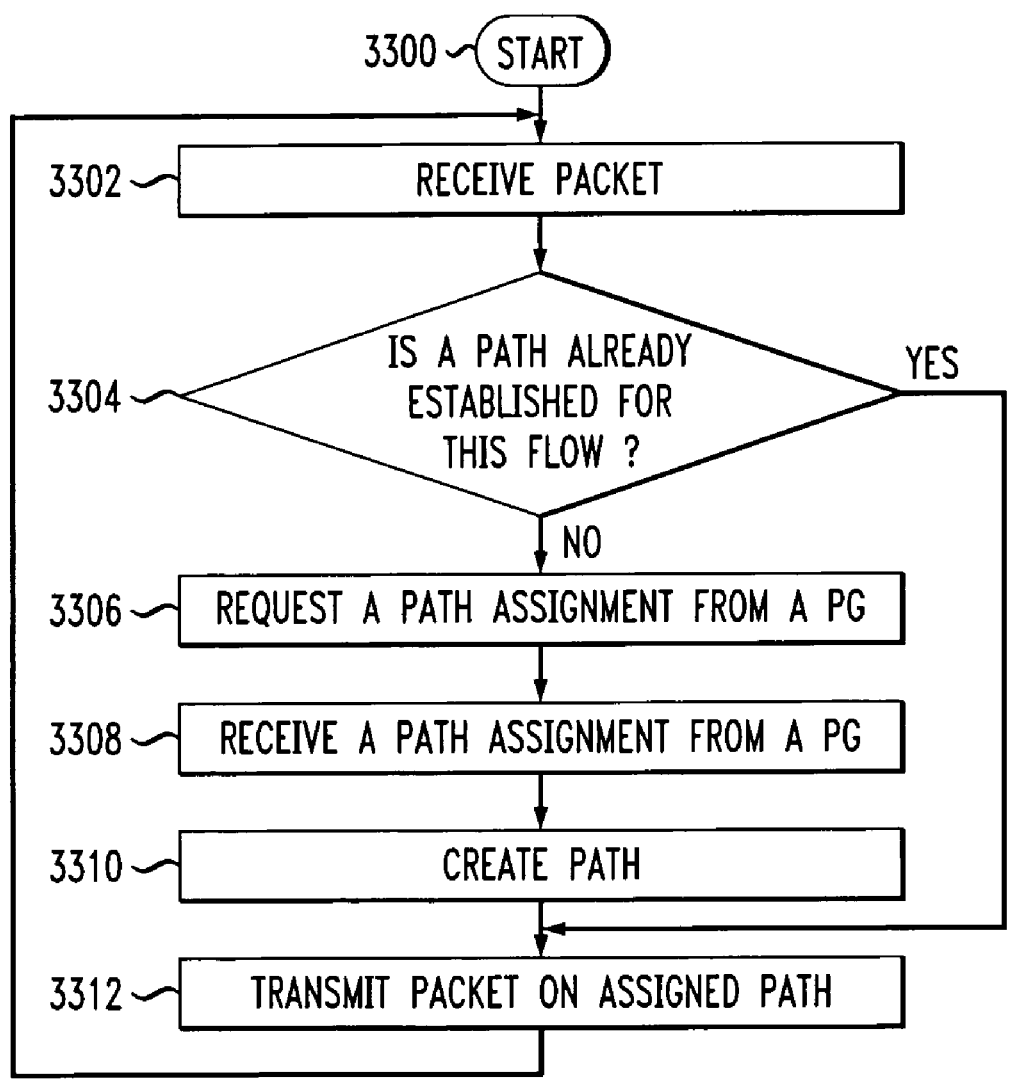
FIGS. 33-34 are flowcharts for the Network Element.

FIG. 33 shows how a network node receives and processes flow to path assignments from a PG. Execution starts (step 3300), and a packet is received by the node from a host (step 3302). A test is done to determine if a path is already established for this flow (step 3304). If a path is already established for the flow, the node transmits the packet on the assigned path (step 3312). If a path is not already established for the flow, a path assignment is requested from a PG (step 3306). This request includes the source address, destination address, type-of-service, and any other data that is needed by the PG to make the assignment. A response from the PG is received by the node (step 3308). The node uses MPLS technology in the current art to create the path (step 3310). The node transmits the packet on the assigned path (step 3312) and the node receives another packet (step 3302).

Figure 34:
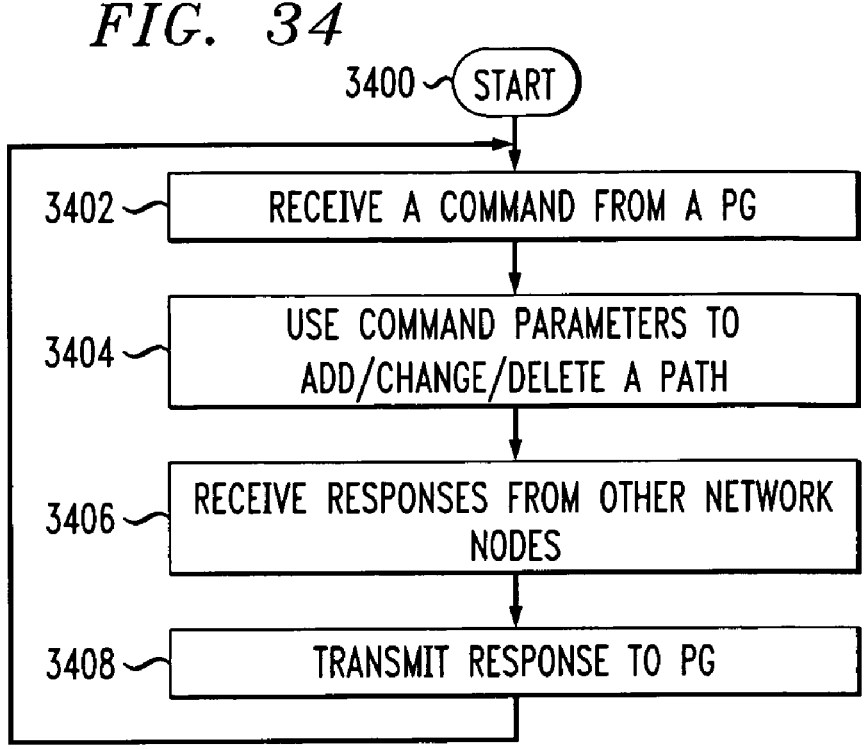

FIG. 34 shows how a network node receives and processes commands from a PG. Execution starts (step 3400), and a command is received from a PG (step 3402). The command parameters are used to add, change, or delete a path (e.g. via an RSVP or LDP message) (step 3404). Responses are received from other network nodes (step 3406). A response is transmitted to the PG by the network node (step 3408).

Web Server, Servlet, and Controller

The PG Web Server 204 receives and processes requests from Web browsers. The current art contains many sources of information about the Hypertext Transfer Protocol (HTTP) that is used for communication between Web browsers and servers. The current art contains much documentation about HTTP. See RFC 2616 Hyptertext Transfer Protocol—HTTP/1.1 by Fielding et. al., June 1999, at ietf.org which is incorporated in its entirety by reference.

Figure 35:
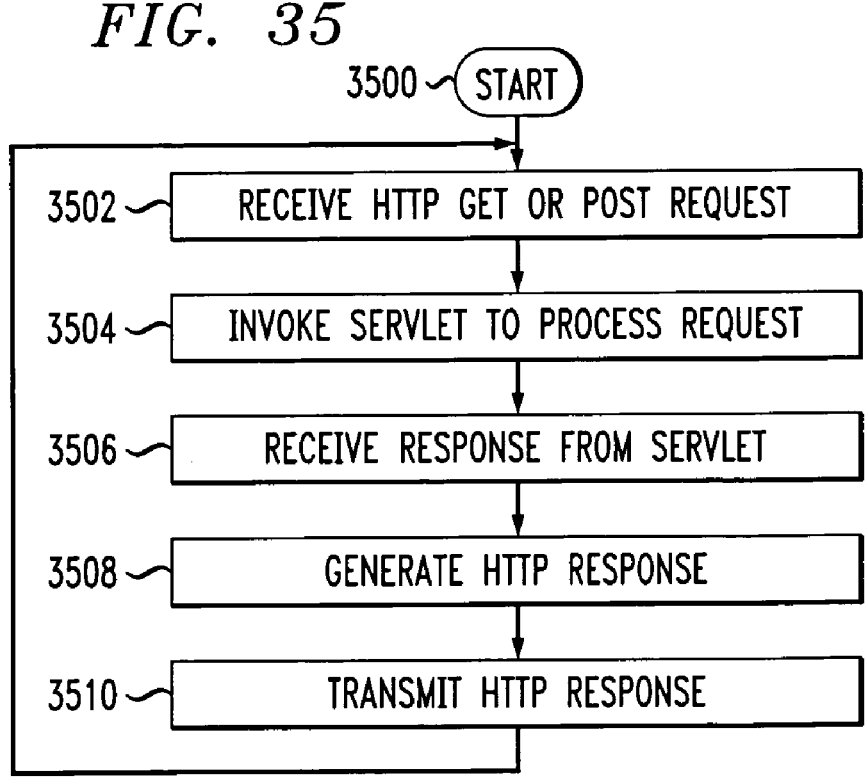
FIG. 35 is a flowchart for the Web server.

FIG. 35 shows a flowchart for the PG Web server. Execution begins (step 3500), and the HTTP GET or POST request is received by the PG web server (step 3502). A servlet is invoked to process the request (step 3504). A response is received from the servlet (step 3506). The PG web server generates and transmits an HTTP response (steps 3508 and 3510).

The use and nature of how servlets operate is well documented. Such documentation can be found at java.sun.com which is incorporated by reference.

Figure 36:
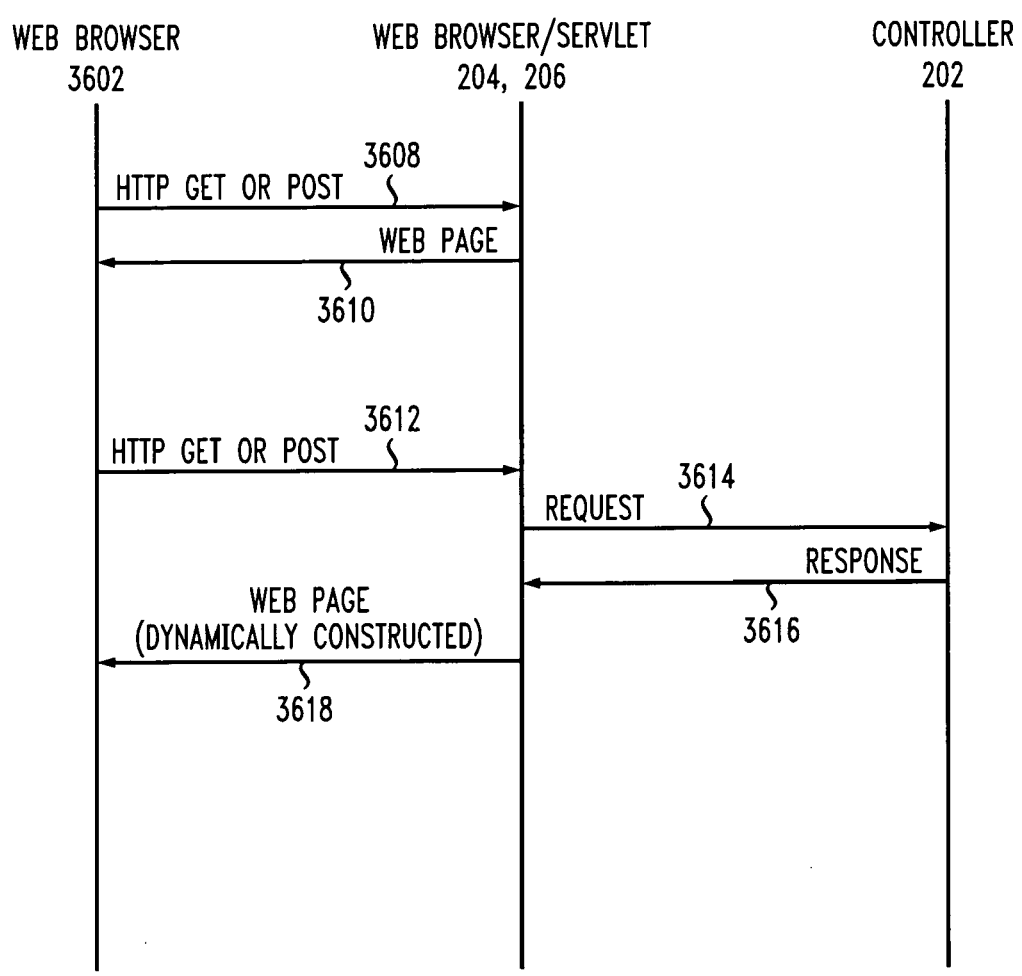
FIG. 36 is a message sequence diagram for the Web Server, servlet, and Controller.

FIG. 36 shows a message sequence diagram that describes the interactions among the Web browser 3602, Web server 204, servlet 206, and Controller 202. The HTTP GET or POST request 3608 is transmitted from the Web browser to the Web server. The Web server invokes a servlet. The servlet 206 executes and a Web page 3610 is dynamically generated and returned to the Web browser 3602.

Some HTTP GET or POST requests 3612 cause the Web server and servlet to transmit a request 3614 to the Controller 202. The Controller 202 returns a response 3616 to the Web server and servlet. The Web server and servlet use this information to dynamically construct a Web page 3618 that is returned to the Web browser 3602.

While the invention has been described with reference to specific embodiments, modifications and variations of the invention may be constructed without departing from the scope of the invention that is defined in the following claims.

What is claimed is:

1. A system for assigning flows to paths in a communication network, the communication network comprising a plurality of nodes, each node being connected to at least one other node by one or more links, each path in the communication network comprising a sequence of network nodes and links for a particular flow, the path starting with a source node and ending with a destination node, the system comprising:
   a Path Generator (PG), wherein the PG designates flow-to-path assignments in the communication network by using a genetic algorithm, wherein said genetic algorithm determines a fitness of a genotype from a plurality of constraint fitness functions, wherein said fitness is determined by using a genotype fitness function that is calculated as a weighted sum of said plurality of constraint fitness functions, wherein a coefficient is used to adjust a relative importance of each of said plurality of constraint fitness functions;
   an input interface, said input interface for connecting the PG and the communication network, the input interface for providing the PG with data from the communication network that pertains to one or more flows; and
   an output interface, the output interface for communicating said flow-to-path assignments designated by the PG to the communication network.

2. The system of claim 1 wherein the PG comprises a Web interface.

3. The system of claim 1 wherein said PG is controlled by a user to create and manage one or more tasks.

4. The system of claim 3 wherein said one or more tasks include a description.

5. The system of claim 3 wherein said one or more tasks include a selection of a network model.

6. The system of claim 5 wherein the network model is obtained from a dynamic routing protocol.

7. The system of claim 5 wherein the network model is obtained by reading configuration data from network nodes.

8. The system of claim 5 wherein said network model includes network nodes and definitions of attributes associated with the network nodes including maximum packets received per second.

9. The system of claim 5 wherein said network model includes network links and definitions of attributes associated with the network links including at least one of bandwidth, delay, jitter, terminations, and cost.

10. The system of claim 3 wherein the one or more tasks include a selection of flow requirements.

11. The system of claim 10 wherein the flow requirements are defined by at least one of the following: peak bandwidth, average bandwidth, number of protection paths, source address, destination address, and priority.

12. The system of claim 3 wherein said one or more tasks include a selection of policy constraints.

13. The system of claim 12 wherein the policy constraints are defined by at least one of the following: requirements to avoid specific network elements or use specific network elements.

14. The system of claim 3 wherein said one or more tasks include a selection of performance measurements and traffic measurements.

15. The system of claim 14 wherein the performance measurements and traffic measurements for nodes and links during a specified time interval may be captured and stored.

16. The system of claim 3 wherein said one or more tasks include a selection of a genetic algorithm.

17. The system of claim 3 wherein said one or more tasks include a specification of an output report.

18. The system of claim 3 wherein said user control of the PG further includes an ability for the user to start and stop the one or more tasks.

19. The system of claim 3 wherein said user control of the PG further includes an ability for the user to view intermediate flow-to-path assignments calculated by the one or more tasks.

20. The system of claim 3 wherein the user control of the PG further includes an ability for the user to define network models.

21. The system of claim 1 wherein said genetic algorithm generates a random set of genotypes which are evaluated using a genotype fitness function.

22. The system of claim 1 wherein the PG uses performance data and traffic data to assign flows to paths.

23. The system of claim 1 wherein the PG assigns existing flows to different paths.

24. The system of claim 1 wherein the PG provides on-demand assignment of new flows to paths.

25. The system of claim 1 wherein the PG may instruct the source node for a flow to follow a specific sequence of nodes and links.

26. The system of claim 1 wherein the PG issues commands to each node along a path.

27. The system of claim 1 wherein the PG provides on-demand re-routing of flows.

28. The system of claim 1 wherein the PG receives notification of network failures or topology changes.

29. The system of claim 1 wherein the PG receives notification of network failures via a dynamic routing protocol.

30. The system of claim 1 wherein the PG operates in stand-alone mode.

31. The system of claim 1 wherein the PG performs modeling of an existing network.

32. The system of claim 1 wherein the PG performs modeling of a non-existing network.

33. The system of claim 1 wherein the PG computes a minimum number of links to satisfy flow requirements and policy constraints.

34. The system of claim 1 wherein the PG computes a minimum cost of links to satisfy flow requirements and policy constraints.

35. A method of assigning flows to paths in a communication network, the communication network comprising a plurality of nodes, each node being connected to at least one other node by one or more links, each path in the communication network comprising a sequence of network nodes and links for a particular flow, the path starting with a source node and ending with a destination node, the method comprising:

connecting a Path Generator (PG) and the communication network via an input interface;

providing the PG with data from the communication network via the input interface that pertains to one or more flows, wherein the PG designates flow-to-path assignments in the communications network by using a genetic algorithm, wherein said genetic algorithm determines a fitness of a genotype from a plurality of constraint fitness functions, wherein said fitness is determined by using a genotype fitness function that is calculated as a weighted sum of said plurality of constraint fitness functions, wherein a coefficient is used to adjust a relative importance of each of said plurality of constraint fitness functions; and communicating said flow-to-path assignments designated by the PG to the communication network via an output interface.

* * * * *